US009525438B2

(12) United States Patent
Smith

(10) Patent No.: US 9,525,438 B2
(45) Date of Patent: *Dec. 20, 2016

(54) METHOD AND SYSTEM FOR PROVIDING EXPLOSION PROOF VIDEO AND COMMUNICATION RELAY MODULE

(71) Applicant: Rivada Research, LLC, Colorado Springs, CO (US)

(72) Inventor: Clint Smith, Warwick, NY (US)

(73) Assignee: RIVADA RESEARCH, LLC, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/865,268

(22) Filed: Sep. 25, 2015

(65) Prior Publication Data

US 2016/0013818 A1  Jan. 14, 2016

Related U.S. Application Data

(63) Continuation of application No. 13/627,666, filed on Sep. 26, 2012, now Pat. No. 9,209,888.

(60) Provisional application No. 61/626,440, filed on Sep. 27, 2011, provisional application No. 61/626,441, filed on Sep. 27, 2011.

(51) Int. Cl.
| | | |
|---|---|---|
| *H04B 7/155* | (2006.01) | |
| *H04B 1/00* | (2006.01) | |
| *H04M 1/18* | (2006.01) | |
| *H04W 52/26* | (2009.01) | |
| *H04W 88/04* | (2009.01) | |

(52) U.S. Cl.
CPC ............ *H04B 1/0064* (2013.01); *H04B 7/155* (2013.01); *H04M 1/18* (2013.01); *H04W 52/265* (2013.01); *H04W 88/04* (2013.01)

(58) Field of Classification Search
CPC ............... G02B 27/017; G02B 2027/0138; G02B 13/06; G06F 3/005; G08B 13/19621; G08B 13/19632; G08B 13/19634; G08B 13/19684; G08B 1/08; G08B 21/0202; H04N 7/181; H04N 5/335; G06K 9/00342; G06K 9/00711; G11B 27/17; G11B 31/00
See application file for complete search history.

(56) References Cited

U.S. PATENT DOCUMENTS

| | | | |
|---|---|---|---|
| 3,981,023 | A | 9/1976 | King et al. |
| 5,327,149 | A | 7/1994 | Kuffer |
| 5,763,882 | A | 6/1998 | Klapper et al. |
| 6,067,189 | A | 5/2000 | Gillich |

(Continued)

FOREIGN PATENT DOCUMENTS

| | | |
|---|---|---|
| CN | 201216206 Y | 4/2009 |
| CN | 102240079 A | 11/2011 |

(Continued)

*Primary Examiner* — Sujatha Sharma
(74) *Attorney, Agent, or Firm* — The Marbury Law Group, PLLC

(57) ABSTRACT

Embodiments of methods, devices and systems are presented for communicating information in an explosive environment. An explosion proof video and data communication module includes features that prevent the generation of a spark or other ignition sources that could ignite explosive dust, gas or vapors in the air. The explosion proof video and communications relay modules may operate independently or as a group to provide real-time information, situation awareness, functionally and responsiveness for personnel that are in explosive environments.

17 Claims, 24 Drawing Sheets

(56) References Cited

U.S. PATENT DOCUMENTS

| | | |
|---|---|---|
| 6,281,620 B1 | 8/2001 | Yeh |
| 6,307,521 B1 | 10/2001 | Schindler et al. |
| 6,485,160 B1 | 11/2002 | Sommers et al. |
| 6,527,419 B1 | 3/2003 | Galli |
| 6,670,763 B2 | 12/2003 | Golz et al. |
| 6,761,467 B2 | 7/2004 | Matthews et al. |
| 6,805,461 B2 | 10/2004 | Witte |
| 6,941,952 B1 | 9/2005 | Rush, III |
| 6,960,776 B2 | 11/2005 | Machi |
| 7,147,343 B2 | 12/2006 | Chapman |
| 7,152,995 B2 | 12/2006 | Chapman |
| 7,182,475 B2 | 2/2007 | Kramer et al. |
| 2002/0172830 A1 | 11/2002 | Zirfas et al. |
| 2002/0196628 A1 | 12/2002 | Yoshida et al. |
| 2003/0073403 A1 | 4/2003 | Miyazaki |
| 2005/0008155 A1 | 1/2005 | Durso et al. |
| 2005/0099805 A1 | 5/2005 | Chapman |
| 2005/0167590 A1 | 8/2005 | Miyano et al. |
| 2006/0048286 A1 | 3/2006 | Donato |
| 2006/0277666 A1 | 12/2006 | Gertsch et al. |
| 2009/0231423 A1 | 9/2009 | Becker et al. |
| 2009/0309855 A1 | 12/2009 | Wang et al. |
| 2010/0061732 A1 | 3/2010 | Lavoie |
| 2013/0329403 A1 | 12/2013 | Boulan |
| 2014/0362244 A1 | 12/2014 | Martin |

FOREIGN PATENT DOCUMENTS

| | | |
|---|---|---|
| CN | 102309082 A | 1/2012 |
| CN | 202600161 U | 12/2012 |

METHOD AND SYSTEM FOR PROVIDING EXPLOSION PROOF VIDEO AND COMMUNICATION RELAY MODULE

RELATED APPLICATIONS

This application is a continuation of U.S. patent application Ser. No. 13/627,666 titled "Method and System for Providing Explosion Proof Video and Communication Relay Module" filed on Sep. 26, 2012, which claims the benefit of priority to each of U.S. Provisional Application No. 61/626,440, entitled "Method and System for Providing Explosion Proof Video and Communication Relay Module" filed Sep. 27, 2011, and U.S. Provisional Application No. 61/626,441, entitled "Method and System for Providing Explosion Proof Emergency Communication Relay Module" filed Sep. 27, 2011, the entire contents of all of which are hereby incorporated by reference.

BACKGROUND

Each day workers put themselves at risk by working in dangerous or potentially dangerous environments involving explosive vapors or gasses. For example, in addition to the risk of cave-ins, sub-surface miners face the risk toxic fumes and explosive gases on a daily basis. As another example, firemen and other first responders frequently have to venture into buildings, subways and sewers filled with explosive gasses in order rescue victims and save property.

Chief among the dangers facing such workers is the possibility of an explosion due to detonation of explosive vapors, gasses and dust suspended in the air in a confined space. One of the top causes of mine explosions is the detonation of explosive gases, such as methane, which can enter the mine through the Earth that is being mined. If proper ventilation procedures are not taken, methane gas (or other explosive gases) may collect in the mine Any ignition source may explosively ignite the gas and lead to catastrophic results.

Fire and rescue personnel face similar dangers when hurricane, tornado or terrorist attacks leave buildings in ruble with natural gas lines leaking. As another example, fire and rescue personnel responding to refinery incidents, and automobile and aircraft accidents can face explosive vapor situations resulting from gasoline and diesel fumes. While gas and vapor levels in one part of a building appear safe, gas and fumes can accumulate in pockets, pits or enclosed rooms to reach potentially explosive concentrations.

In addition to explosive gases, combustible dust can give rise to an explosive environment. Such dust explosion risks can arise in a variety of situations such as factory mishaps, grain milling and storage facilities.

In addition to fire and rescue personnel, many work environments require communications in the presence of explosive gasses and vapors. The Occupational Safety and Health Administration (OSHA) has classified a number of hazardous work environments where special precaution must be taken to provide workers with safe working conditions. The most extreme work environment is classified as Class I, Division 1. A Class I, Division I work environment is a location in which: (a) hazardous concentrations of flammable gases or vapors may exist under normal operating conditions; (b) hazardous concentrations of such gases or vapors may exist frequently because of repair or maintenance operations or because of leakage; or (c) breakdown or faulty operation of equipment or processes might release hazardous concentrations of flammable gases or vapors, and might also cause simultaneous failure of electric equipment.

Examples of work locations where Class I, Division I classifications are typically assigned include locations where volatile flammable liquids or liquefied flammable gases are transferred from one container to another, interiors of spray booths and areas in the vicinity of spraying and painting operations where volatile flammable solvents are used, locations containing open tanks or vats of volatile flammable liquids, drying rooms or compartments for the evaporation of flammable solvents, locations containing fat and oil extraction equipment using volatile flammable solvents, portions of cleaning and dyeing plants where flammable liquids are used, gas generator rooms and other portions of gas manufacturing plants where flammable gas may escape, inadequately ventilated pump rooms for flammable gas or for volatile flammable liquids, the interiors of refrigerators and freezers in which volatile flammable materials are stored in open, lightly stoppered, or easily ruptured containers; and all other locations where ignitable concentrations of flammable vapors or gases are likely to occur in the course of normal operations.

For personnel who work in such environments on a daily basis, a communication system to improve situation awareness is needed so those personnel can safely operate in explosive environments. Similarly, emergency services personnel who may have to enter explosive environments to respond to emergency situations need an explosion-proof communication system to improve the situation awareness both in terms of voice communication as well as visual and other telemetry methods.

Additionally not only is situation awareness needed by the personnel entering into the explosive environment their command structure needs to have eyes and ears on the ground to have real time information so that the situation can be properly sized up and the requisite resources can be applied, reassigned or personnel in the explosive environments can be informed if and when it is best to exit the location.

SUMMARY

The various embodiments include an explosion-proof communication device, which may include, a non-conductive housing, a first antenna, a second antenna, a radio receiver, a radio transmitter, a battery coupled to a fault tolerant circuit element, a processor coupled to the first antenna, second antenna, radio receiver, radio transmitter, and battery. The processor may be configured with processor executable software instructions to perform operations including, receiving radio frequency signals from the first antenna at a first frequency, and retransmitting the received frequency signals from the second antenna at a second frequency. In an embodiment, the first frequency may be different from the second frequency. In an embodiment, the processor, first antenna, second antenna, radio receiver, radio transmitter, battery, and fault tolerant circuit element are hermetically sealed inside the non-conductive housing. In an embodiment, the battery may be a rechargeable battery, and the explosion-proof communication device further including, a rectifier coupled to the rechargeable battery, and an induction coil coupled to the rectifier. In an embodiment, the induction coil and rectifier are configured to generate a voltage operable to charge the rechargeable battery when an alternating magnetic field may be applied to the induction coil.

In a further embodiment, the explosion-proof communication device includes, a transistor coupled between the rectifier and the rechargeable battery with a control lead coupled to the processor, and the processor may be configured with processor-executable software instructions to perform operation further including, regulating the charging of the rechargeable battery when the voltage is generated by the induction coil and rectifier. In a further embodiment, the radio receiver and radio transmitter may include, a signal generator configured to generate a radio frequency signal having a third frequency.

In a further embodiment, the processor may be configured with processor-executable software instructions to perform operation further including, adjusting the frequency in of the radio frequency signal generated by the signal generator. In a further embodiment, the processor may be configured with processor-executable software instructions to perform operations further including, controlling an output power of the radio receiver and radio transmitter to maintain the output power at a minimum level consistent with a minimum quality of the service metric and below a maximum output power level. In a further embodiment, the processor may be configured with processor-executable software instructions to perform operations further including, grouping the relay device with a wireless transceiver in proximity to the relay device to form a communication group, in which receiving radio frequency signals from the first antenna at a first frequency may include receiving receive radio frequency signals from the wireless transceiver in the communication group.

In a further embodiment, the explosion-proof communication device includes a fastener attached to the non-conductive housing and configured to secure the explosion-proof communication relay device to a helmet. In a further embodiment, the fastener may include a strap. In a further embodiment, fastener may include a fabric hook-and-loop fastening element. In a further embodiment, the explosion-proof communication device may include a selector switch coupled to the non-conductive housing and arranged so that it may be actuated by a human user wearing gloves to cause the processor to perform one or more operations. In a further embodiment, the explosion-proof communication device may include a camera, and a lens cover arranged to seal and isolate the camera from an exterior atmosphere. In a further embodiment, the explosion-proof communication device may include an illumination source mounted behind a camera lens of the camera and arranged so as to not impede the illumination capability of the illumination source.

In an embodiment, the processor may be configured with processor-executable software instructions to perform operations further including, receiving instructions from a second explosion-proof communication relay device, and adjusting a resolution of video information collected by the camera based on the received instructions. In a further embodiment, the explosion-proof communication device may include a sensor hermetically sealed inside the non-conductive housing and configured to monitor environmental conditions outside the non-conductive housing. In a further embodiment, the explosion-proof communication device may include an audio circuit hermetically sealed inside the non-conductive housing and configured to a microphone and a speaker outside of the non-conductive housing from within the hermetically sealed non-conductive housing.

Further embodiments include a communication system for use in an explosive environment including a first and second explosion-proof communication relay device, each of which may include, a non-conductive housing, a first antenna, a second antenna, a radio receiver, a radio transmitter, a battery coupled to a fault tolerant circuit element, a processor coupled to the first antenna, second antenna, radio receiver, radio transmitter, and battery, in which the processor may be configured with processor executable software instructions to perform operations including, receiving radio frequency signals from the first antenna at a first frequency, and retransmitting the received frequency signals from the second antenna at a second frequency. In an embodiment, the first frequency may be different from the second frequency. In an embodiment, the processor, first antenna, second antenna, radio receiver, radio transmitter, battery, and fault tolerant circuit element are hermetically sealed inside the non-conductive housing. In an embodiment, the processor of the first explosion-proof communication relay device may be further configured with processor executable software instructions to perform operations further including, establishing a communication link with the second explosion-proof communication relay device.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
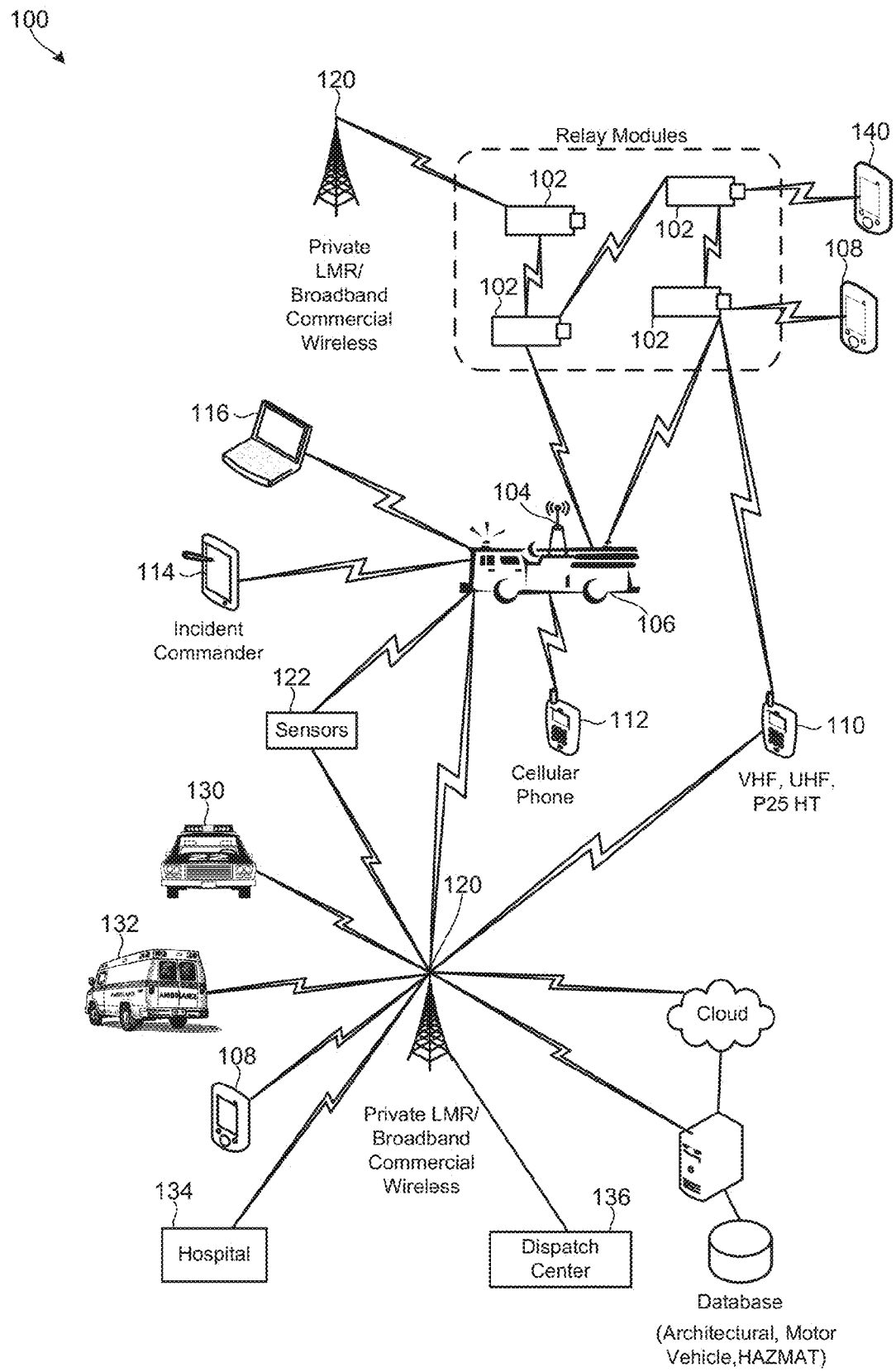
FIG. 1 is a system block diagram illustrating information flows, communication links, and components in an example communication system in which an embodiment explosion-proof relay module may be deployed.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "cellular telephone," and "cell phone" are used interchangeably herein to refer to any one or all of cellular telephones, smartphones, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals.

The terms "wireless network," "network," "cellular system," "cell tower," and "radio access point" are used generically herein to refer to any one of various wireless mobile systems, technologies, and/or components. In an embodiment, wireless network may be a radio access point (e.g., a cell tower), which provides a radio link to the mobile device so that the mobile device can communicate with core network components.

A number of different methods, technologies, solutions, and/or techniques (herein collectively "solutions") are currently available for determining the location of mobile device, any or all of which may be implemented by, included in, and/or used by the various embodiments. Such solutions include, e.g., global positioning system (GPS) based solutions, assisted GPS (A-GPS) solutions, and cell-based positioning solutions such as cell of origin (COO), time of arrival (TOA), observed time difference of arrival (OTDOA), advanced forward link trilateration (AFLT), and angle of arrival (AOA). In various embodiments, such solutions may implemented in conjunction with one or more wireless communication technologies and/or networks, including wireless wide area networks (WWANs), wireless local area networks (WLANs), wireless personal area networks (WPANs), and other similar networks or technologies. By way of example, a WWAN may be a Code Division Multiple Access (CDMA) network, a Frequency Division Multiple Access (FDMA) network, an OFDMA network, a 3GPP LTE network, a WiMAX (IEEE 802.16) network, and so on. The WPAN may be a Bluetooth network, an IEEE 802.15x network, and so on. A WLAN may be an IEEE 802.11x network, and so on. A CDMA network may implement one or more radio access technologies (RATs) such as CDMA2000, Wideband-CDMA (W-CDMA), and so on.

As used in this application, the terms "component," "module," "engine," "manager" are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EVDO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The manufacture, processing, mining, transport, and/or storage of certain materials may create or release gases, vapors, and/or combustible dust into the environment, which when combined with oxygen in the air, may create an explosive environment. To minimize the risk of an explosion, equipment used by workers who venture into such hazardous environments typically cannot include any components that may cause sparks or otherwise become an ignition source.

Conventional mobile electronic devices, such as mobile phones and cameras, typically include exposed metal components and electronic circuitry that may cause sparks or otherwise ignite a highly explosive environment. Therefore, conventional mobile electronic devices are not suitable for use in explosive environments, and must be removed by first responders (e.g., police, fire, and emergency personnel) entering a hazardous area.

The various embodiments provide scalable, wireless, multi-channel, and/or two-way communication devices and systems suitable for use in explosive environments. Various embodiments include explosion-resistant or explosion-proof communications module/device having hermetically sealed components and/or fault-tolerant electronic circuitry that is resistant to heat and sparks.

Various embodiments include an explosion-resistant communication system that includes an explosion-proof video and communication relay module and one or more explosion-proof mobile devices, such as hermetically sealed cellular telephones, radio communication modules, video cameras, led lighting, sensors, and other devices suitable for use in explosive environments.

The explosion-proof communication relay modules may be configured to provide enhanced situation awareness capabilities in an explosive environment, which is of particular importance to first responders and emergency personnel deployed in disaster sites. An explosion-proof video and communication relay module may also include fault-tolerant electronics, which may be battery powered and enclosed within a non-metallic sealed housing to reduce or remove threats from sparks and/or heat. In an embodiment, the explosion-proof video and communication relay module may include an inductive charging element built into its housing to enable charging of the battery without any exposed metal contacts that could serve as a source for a spark. In an embodiment, the explosion-proof video and communication relay module may include control buttons sized to enable operation by personnel wearing gloves and protective clothing.

FIG. 1 illustrates example components in an explosion-resistant communication system 100 according to an embodiment. In the example illustrated in FIG. 1, the explosion-resistant communication system 100 includes a sensor module 122, multiple explosion-proof video and communication relay modules 102, and a local or small cell site 104. The local/small cell site 104 may be installed at the incident scene or on a mobile platform, such as the illustrated fire engine/truck 106. The relay modules 102 may be installed on equipment worn or carried by first responders, emergency services personnel, and/or workers at the incident scene. The relay modules 102 may be explosion-proof components in which all of the circuitry, electronics, wires, contacts, and metal elements are encapsulated in a hermetic or airtight sealed case/housing formed from non-conductive materials.

The sensor module 122 may include one or more explosion-proof devices (not illustrated), which may be linked into the communication architecture of one or more of the relay modules 102. The sensor module 122 may be embedded in a relay module 102, external to the relay module 102, in communication with a relay module 102, or any combination thereof.

The local/small cell site 104 may be configured to communicate with the sensor module 122 and various mobile devices, such as the illustrated cellular phone 112, handheld computer-like tablet of an incident commander 114, and laptop 116. The local/small cell site 104 may also be configured to communicate with a variety of other mobile devices and communication centers via the radio access node 120 coupled to a commercial or private cellular communications network. In the example illustrated in FIG. 1, the local/small cell site 104 communicates with safety personnel 130, emergency medical services 132, smartphones 108, hospitals 134, dispatch centers 136, and radio access devices 110, all via the radio access node 120.

The radio access nodes 120 may operate to connect voice and data calls between mobile devices (e.g., mobile phones), data centers, the local/small cell site 104, the relay modules 102, and/or other network destinations, such as via telephone land lines (e.g., a POTS network, not shown) and the Internet. In various embodiments, the radio access nodes 120 may include any wireless base station or radio access point (e.g., LTE, CDMA2000/EVDO, WCDMA/HSPA, IS-136, GSM, WiMax, WiFi, AMPS, DECT, TD-SCDMA, or TD-CDMA), a switch, Land Mobile Radio (LMR) interoperability equipment, a satellite Fixed Service Satellite (FSS) for remote interconnection to the Internet and PSTN, a network operations center, and/or other components for sending and receiving communication signals to and from various network components.

When implemented in a 3GPP-LTE network, radio access nodes 120 may include an Evolved Serving Mobile Location Center (E-SMLC) component configured to send and receive location information (e.g., latitude, longitude, altitude, velocity, etc.) to and from the mobile devices and relay modules 102, which may be achieved both on-net and off-net. The location information may be delivered in standard formats, such as those for cell-based or geographical co-ordinates, together with the estimated errors (uncertainty) of the location, position, altitude, and velocity of a mobile device and, if available, the positioning method (or the list of the methods) used to obtain the position estimate. In an embodiment, the E-SMLC may be configured to provide location services via a lightweight presentation protocol LPP that supports the provision of application services on top of TCP/IP networks. In an embodiment, the E-SMLC may also send and/or receive (e.g., via LPP) almanac and/or assistance data to and from core components, such as an eNodeB and a mobility management entity (MME).

The relay modules 102 may include communications circuitry for sending and receiving voice, data, content, images, video, broadband information, and other communications/information to and from each other 102, the local/small cell site 104, mobile devices 108, 110, 140, and cellular communications networks (both commercial and private). The relay modules 102 may communicate with the cellular networks via the radio access node 120. The mobile devices 108, 110, 140 may include smartphones 108, radio communication devices 110 (e.g., VHF, UHF, LMR, and/or P25 HT communications devices), and other intrinsically safe communication devices 140 configured to present voice, data, content, images, video and broadband information to a person wearing or holding the respective device 108, 110, 140.

The relay modules 102 may be configured so that cellular telephone communications in the 700 MHz Public Safety band (or any other frequency band, such as 450 MHz, 700 MHz, 850 MHz bands, the 1710-1755 MHz and 2110-2155 MHz AWS bands, etc.) are communicated between the radio access nodes 120, cellular telephones 112, and the relay modules 102 in frequency-division duplex and/or time-division duplex formats. In other embodiments, relay modules 102 may be configured to communicate any or all cellular telephone frequencies currently available or which may be used in the future.

In various embodiments, the explosion-resistant communication system 100 may be implemented on half-duplex and/or full-duplex communication systems. For cellular telephone communications, which may be full duplex systems that use different frequencies for transmitting and receiving information, different frequencies may be used for conveying communication signals between the relay modules 102 and mobile devices, such as cellular phones 112. For example, a first relay module 102 may be configured to receive transmissions from a radio access node 120 in a first modulation format (e.g., time, frequency, etc.) or technology, and relay the received transmissions to a second relay module 102 in a second modulation format or technology. The second relay module 102 may relay the received transmissions to the cellular phone 112 in a format supported by that cellular phone 112. In this manner, any of a number of commercially available cellular phones 112 may be deploy in, or supported by, the explosion-resistant communication system 100, without requiring any modifications to the transceivers or other components of the cellular phone 112.

In various embodiments, the relay modules 102 may be configured to select a frequency range for relaying communication signals between various components, such as between a radio access node 120 and a mobile device 108.

In an embodiment, the relay modules 102 may be configured to select a relay frequency that reduces likelihood of the electromagnetic radiation inducing currents in surrounding metals. This configuration is particularly useful for emergency services applications, where the relay modules 102 may be deployed in confined areas and/or areas with limited radio frequency transmission capabilities (e.g., underground in subways, sewers, mines, tunnels or explosion craters).

In an embodiment, the relay modules 102 may be configured to select a relay frequency based upon the transmission characteristics of the communication signals.

In various embodiments, the relay frequency may be selected with or without concern for interference with other frequencies, such as frequencies allocated to other commercial communication systems.

In an embodiment, the relay modules 102 may be configured to select a relay frequency based on the conditions of local communications systems. For example, in an embodiment, a relay module 102 may be configured to detect the presence of other communication systems and/or communication signals within the vicinity of the incident scene, and select a relay frequency that is not likely to interfere with the detected communication systems/signals. Alternatively, or in addition to detecting the presence of other communications systems, the relay modules 102 may be configured to select a relay frequency so as to reduce the likelihood of interference with other communications known to exist in the vicinity of the incident scene. Such configurations may be particularly useful when the explosion-proof video and relay modules 102 are deployed in certain hazardous environment (e.g., mining, chemical and/or petroleum industrial facilities) and/or used for non-emergency applications.

In an embodiment, the relay modules 102 may be configured to select a relay frequency based on licensing agreements and/or frequency-use requirements, such as a license agreement with the Federal Communications Commission (FCC) that constrains or restricts the use of the available frequency bands. This configuration may be particularly useful in above-ground applications, where communication signals relayed by the relay modules 102 are more likely to interfere with communication signals in a frequency range controlled by the FCC.

The relay modules 102 may be configured to select a relay frequency based on any or all of the factors discussed above.

The relay modules 102 may operate in a point-to-point communication and relay scheme. The relay modules 102 may also operate in a mesh, loop, and/or a self-healing environment. In an embodiment, relay modules 102 and/or mobile devices 108, 110, 112, 114, 116, and 140 may be configured to automatically establish a mesh, loop, and/or a self-healing network in response to detecting that direct point-to-point communications are not available. In an embodiment, the relay modules 102 may be organized in a self-healing ring, which may include each relay module 102 having a bidirectional link to two or more of the other relay modules 102.

In an embodiment, the relay modules 102 may include a cellular communications module. In an embodiment, the mobile devices 108, 110, 112, 114, 116, and 140 and/or the relay modules 102 may include components (e.g., non-transitory computer readable media, processors, etc.) that store and/or execute client software configured to support specific vintages and/or versions of the cellular communications modules included in the relay modules 102.

As mentioned above, the relay modules 102 may communicate with radio communication devices 110, such as LMR two-way radios. Thus, in an embodiment, the relay modules 102 may be configured to support the frequencies and/or modulation formats associated with various radio communication devices 110. For example, the relay modules 102 may be configured to support half-duplex or simplex communication formats in which the communications signals are received and transmitted on the same frequency to support communications with a LMR two-way radio.

Figure 2:
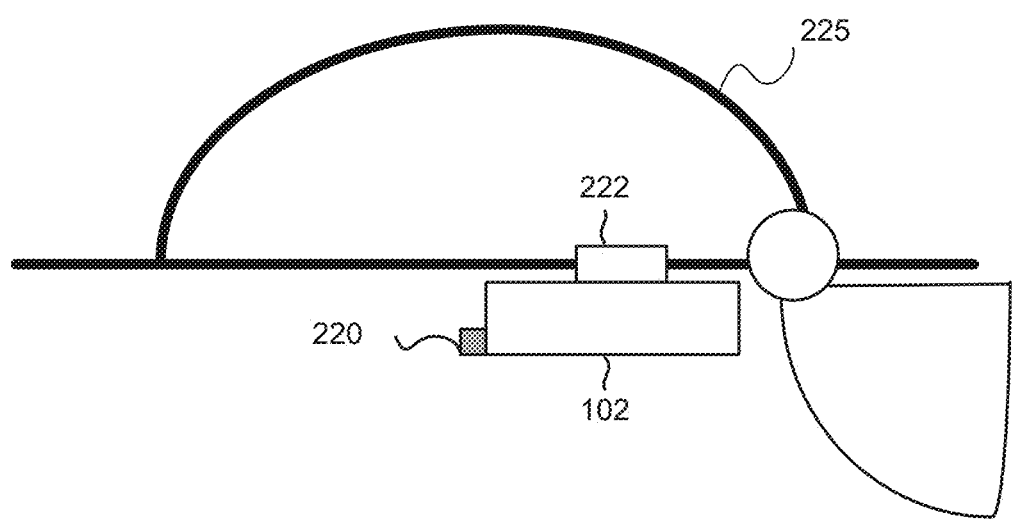
FIG. 2 is an illustration of an embodiment explosion-proof relay module mounted on helmet suitable for use emergency personnel in explosive environments.

FIG. 2 is an illustration of an embodiment explosion-proof relay module 102 mounted on helmet 225 suitable for use in explosive environments by emergency services personnel. The explosion-proof video and relay module 102 may be mounted in a variety of locations on the helmet 225 via a fastener 222 and/or other means. The fastener 222 may be attached to a non-conductive housing of the relay module 102 and configured to secure the relay module 102 to the helmet 225. For example, the fastener 222 may include a fastening mechanism configured to engage a fastening unit attached to the helmet 225. In various embodiments, the fastening mechanism may be fabric hook-and-loop fastener (e.g., VELCRO®, etc.), hook tape, loop tape, sliding-engaging fastener, straps, locking clips, mounting clips, and/or any other similar fastening mechanisms currently known or which may be developed in the future.

The explosion-proof relay module 102 may be include, or may be coupled, to a selector switch 220, which may be any push button and/or rotary switch that may be actuated by a human user wearing thick or flame resistant gloves. The selector switch 220 may be implemented as a hard key, a soft key, a touch key, or any other way of receiving user input.

Figure 3:
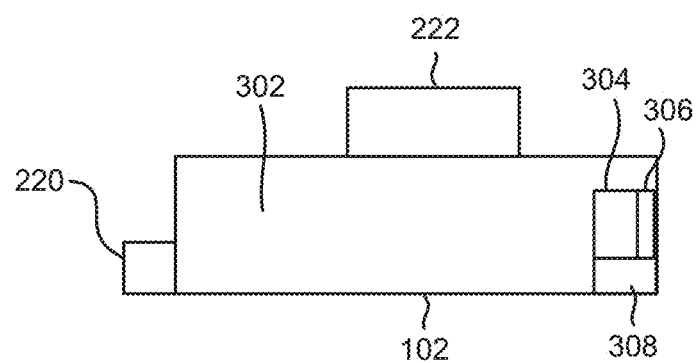
FIG. 3 is a block diagram illustrating various components that may be included in an embodiment explosion-proof relay module.

FIG. 3 is an illustration of an embodiment explosion-proof relay module 102. The relay module 102 may include communications circuitry for sending and receiving voice, data, video, and other similar information, an illumination source (e.g., light emitting diodes, etc.) 308, a selector switch 220, a camera 304, a lens cover 306, and a sealed case or housing 302.

All of the electronics, wires, contacts, and metal elements of the relay module 102 may be included in the sealed case/housing 302. The sealed case/housing 302 may be formed from non-conductive materials, such as plastics, rubbers, thermoplastics (e.g., poly-methyl-methacrylate or Plexiglas), etc. The sealed case/housing 302 may be formed to include a hermetic and/or airtight seal that isolates the electronics, wires, contacts, and metal elements of the relay module 102 (including the camera 304 and illumination source 308) from the exterior atmosphere and oxygen in the air.

Any of a variety of known mechanisms, components, and techniques may be used to create the airtight seal around the non-conductive materials of the case/housing 302, including snap fits, compression fits, sealing rings, threaded fasteners (e.g., nylon screws) to provide sealing pressure, etc. By sealing all electronics and metal within a non-conductive case/housing 302, the potential sources of sparks and/or ignition (e.g., electronics, metal, etc.) may be isolated from the exterior atmosphere, reducing the likelihood that they will cause an ignition in explosive environments.

In an embodiment, the relay module 102 may include a camera 304 configured to capture images and/or video information, which may be relayed to mobile devices 108, 110, 140, the local/small cell site 104, and/or the radio access node 120 in real-time or near real-time. The camera 304 may include a lens cover 306 that seals and isolates the camera 304 from the exterior atmosphere. In various embodiments, the camera 304 may include any or all of a day vision component, a night vision component, an infrared component, a thermal imaging component, an active illumination component, an image intensification component, a laser range gated imaging component, and/or any other imaging technologies currently known or which will be developed in the future.

In an embodiment, the relay module 102 may include a personal illumination module. The personal illumination module may include a light emitting diode (LED) and/or other sources of illumination. In an embodiment, the illumination source (e.g., LED, etc.) may be mounted behind the camera 304 lens. In an embodiment, the illumination source may be positioned so that the camera 304 lens will not impede the illumination capability of the illumination source. In an embodiment, the illumination source may be positioned so that the camera 304 lens protects the illumination source. In various embodiments, the illumination source and/or the camera 304 lens may be positioned inside of the sealed case/housing 302 and/or to form part of the hermetic seal around the sealed case/housing 302.

Figure 4:
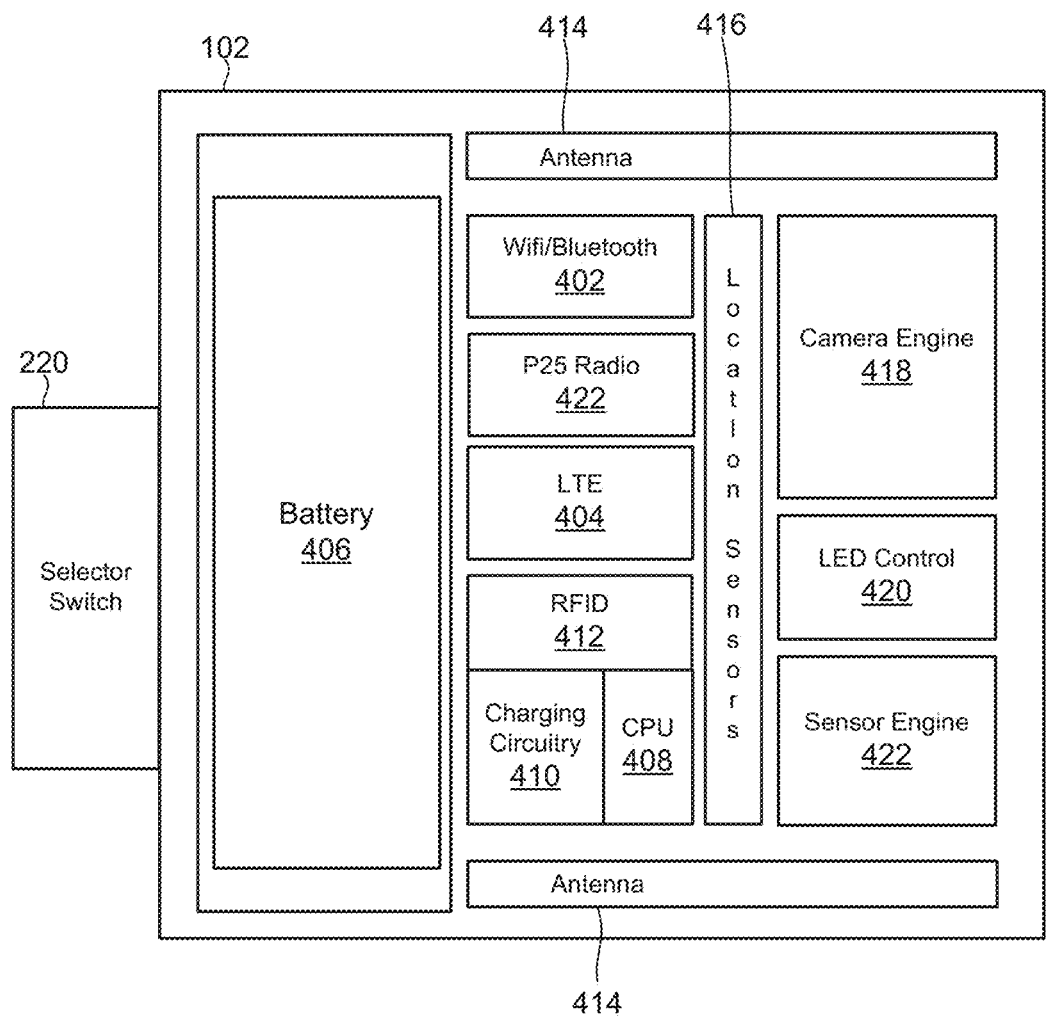
FIGS. 4-5 are component block diagrams illustrating various logical and functional components of an embodiment explosion-proof relay module.

FIG. 4 illustrates various logical and functional components that may be included in an embodiment relay module 102. The relay module 102 may include a selector switch 220, a battery 406, a processor or central processing unit (CPU) 408, charging circuitry 410, a radio-frequency identification (RFID) module 412, antennas 414 for sending and receiving electromagnetic radiation, location sensors 416, a camera engine 418, an LED control module 420, a sensor engine 422, and other well known components (e.g., accelerometer, etc.) commonly included in modern electronic devices (e.g., smartphones, mobile gaming consoles, etc.). The relay module 102 may also include multiple built-in low power and/or cellular radio systems, such as the illustrated Bluetooth/WiFi radios 402 and LTE module 404, as well as any other low power and/or cellular radio systems currently available or which may be developed in the future.

The antennas 414 may be dual-polarized and/or employ any mounting or design technique currently known or which may be developed in the future. In various embodiments, the antennas 414 may be oriented to optimize communications between the relay module 102 and the local/small cell site 104, mobile devices, 108, 110, 140, radio access node 120 and/or commercial/private communication systems.

In an embodiment, the location sensors 416 and/or the LTE module 404 may include a global positioning system (GPS) receiver configured to receive GPS signals from GPS satellites to determine the geographic position of the relay module 102.

One of the challenges associated with using GPS and other geo-spatial positioning technologies on the relay module 102 is that the relay module's 102 ability to acquire satellite signals and navigation data to calculate its geospatial location (called "performing a fix") may be hindered when the relay module 102 is indoors, below grade, and/or when the satellites are obstructed (e.g., by tall buildings, etc.). For example, the presence of physical obstacles, such as metal beams or walls, may cause multipath interference and signal degradation of the wireless communication signals when the relay module 102 is indoors. As another example, the relay module 102 may not have sufficient access to satellite communications (e.g., to a global positioning system satellite) to effectively ascertain its current location. In addition, the position accuracy afforded by existing technologies is not sufficient for use in emergency services due to the relatively high level of position accuracy required by these services.

For these and other reasons, GPS technologies may not always be available or suitable for use by the relay module 102. Accordingly, in an embodiment, the location sensors 416 may include accelerometers, gyroscopes, magnetometers, pressure sensors, and/or other sensors for determining the orientation and/or geographic position of the relay module 102, such as sensors for determining the radio signal delays (e.g., with respect to cell-phone towers and/or cell sites), performing trilateration and/or multilateration operations, identifying proximity to known networks (e.g., Bluetooth® networks, WLAN networks, WiFi, etc.), and/or for implementing other known location-based technologies. In an embodiment, the location sensors 416 may include one or more sensors 309 for monitoring physical conditions (e.g., direction, motion/acceleration, orientation, pressure, etc.) on or around the relay module 102. In an embodiment, the relay module 102 may include multiple and/or redundant sensors (e.g., two gyroscopes, two accelerometers, etc.) for improved reliability, more accurate measurements, and/or refined positional fixing.

In various embodiments, the relay module 102 may be configured to use the location information collected by the location sensors 416 for refined positional fixing and/or positional tracking in locations where GPS signals are not available or determined to be unreliable. The relay module 102 may send location information collected by the location sensors 416 to the local/small cell site 104, mobile devices, 108, 110, 140, and/or radio access node 120. The relay module 102 may also compute its current location based on information collected by the location sensors 416, and send its computed location information to the local/small cell site 104, mobile devices, 108, 110, 140, and/or radio access node 120.

In various embodiments, the relay module 102 may be configured to generate or compute enhanced location information, which may be achieved via one or more of the techniques disclosed in U.S. patent application Ser. No. 13/491,915 titled Method and System for Providing Enhanced Location Based Information for Wireless Handsets filed on Aug. 14, 2012, the entire contents of which is hereby incorporated by reference. In such embodiments, the location sensors 416 may collect or generate location information about the relay module 102 for refined positional fixing and/or positional tracking in locations where GPS signals are not available or reliable.

The processor/CPU 408 of the relay module 102 may be configured to receive processor-executable software instructions, which may included in communication signals transmitted by the radio access node 120, the local/small cell site 104, the local incident command using a local terminal 116, handheld computer 114, and/or any other network component. The processor/CPU 408 may implement the received instructions to change or update the operations of the relay module 102. For example, the processor/CPU 408 may receive instructions from the handheld computer 114 and execute/implement the received instructions to change the type of information (e.g., video, voice, or telemetry) collected and/or relayed by the relay module 102. In this manner, a local incident commander may control what types of information are collected by the relay modules 102 and/or what types of information are made available to the networked components (e.g., handheld computer 114, mobile devices, etc.).

The processor/CPU 408 may also be configured to send and receive information to and from other electronic devices in close proximity to the relay module 102. For example, the processor/CPU 408 may be configured to receive information from an oxygen sensor worn by a first responder at the incident scene, and determine whether additional conditions should be monitored and/or whether additional information should be collected by the relay module 102 based on the information received from the oxygen sensor. The relay module 102 may communicate the received oxygen sensor information and information collected/generated in response to receiving the oxygen sensor information to any networked component (e.g., handheld computer 114, mobile devices, etc.) and/or display the information on an electronic display coupled to the relay module. In this manner, the relay module 102 may be configured detect a changing situation requiring the attention of a relevant actor (e.g., a person wearing the relay module, emergency personnel, the local incident commander, etc), and inform the relevant actor of the changing situation.

In an embodiment, the relay module 102 may be configured to send, receive, and/or relay information to other relay modules 102 and/or selected devices via a radio frequency link, which may be controlled by the radio-frequency identification module 412. In an embodiment, the relay modules 102 may update or adjust their operations based on the information received from other relay modules 102 over the radio frequency link. For example, a first relay module 102 may be configured to send biometric information collected by the sensors 416 to a second relay module 102 over a radio frequency link. In this manner, relay modules 102 within the same vicinity or explosive environment may remain informed of the conditions (e.g., current air supply, heart rate, body temperature, battery status, etc.) associated with the other relay modules 102 and/or users of the other relay modules 102, and adjust their operations accordingly.

In an embodiment, the relay module 102 may communicate with other relay modules and/or any RF, WiFi or Bluetooth enabled device via the RFID 412 and/or WiFi/Bluetooth 402 modules. For example, in an embodiment, the relay module 102 may receive information from medical equipment and/or other devices capable of sharing telemetry information via the RFID 412 and/or WiFi/Bluetooth 402 modules, and update or adjust its operations based on the received information.

In an embodiment, the relay module 102 may include components (e.g., non-transitory computer readable media, processor, etc.) that store and/or execute client software. In an embodiment, the client software may be tailored for the type of environment in which the relay module 102 is deployed. In an embodiment, the relay module 102 may automatically detect environment in which is deployed, and automatically modify the client software functionality and/or relay module 102 functionality to match the detected environment.

In an embodiment, the relay module 102 may include a camera engine 418 configured to control one or more cameras of the relay module 102, which may include a standard camera, a night vision camera, an infrared camera, or any other camera currently available or which may be developed in the future.

In an embodiment, the relay module 102 may configured to adjust the quality and/or resolution of the images and video information collected by the camera of the relay module 102. In an embodiment, the relay module 102 may configured to adjust the quality and/or resolution of the video feeds transmitted from, or received by, the relay module 102. In an embodiment, the relay module 102 may be configured to adjust the quality and/or resolution of the videos and/or video feeds based on the detected environmental or network conditions, situation awareness, and/or instructions received from the radio access node 120, the local/small cell site 104, the local incident command using a local terminal 116, a handheld computer 114, etc.

In an embodiment, the relay module 102 may include an LED control 420 module configured to control one or more LEDs or illumination sources of the relay module 102. In an embodiment, the LEDs or illumination sources of the relay module 102 may be arranged so that they may be quickly replaced with other sensors, depending on the particular application and/or environment in which relay module 102 is deployed.

In order to reduce the potential sources of arching that could cause an explosion, the relay module 10 may be powered by an internal battery 406. The internal battery 406 may include one or more rechargeable or non-rechargeable batteries. Since rechargeable batteries do not require frequent replacement, their inclusion in the relay module 102 may eliminate or reduce the frequency in which the housing is opened and/or the frequency in which the air-tight seal is broken. In various embodiments, the relay module 102 may include any type of rechargeable battery currently known or which may be developed in the future, including nickel cadmium, nickel hydride, nickel-metal hydride, or lithium-ion batteries.

To eliminate external metal contacts (which could serve as an ignition source), the relay module 10 may include charging circuitry 410, which may be configured to fit into, and receive power from, a charging receptacle. In an embodiment, charging circuitry 410 may be configured to recharge the battery 406 using an induction charging system, which may be powered by the charging receptacle. Details regarding the induction charging system and charger are described more fully below with reference to FIG. 9.

Figure 5:
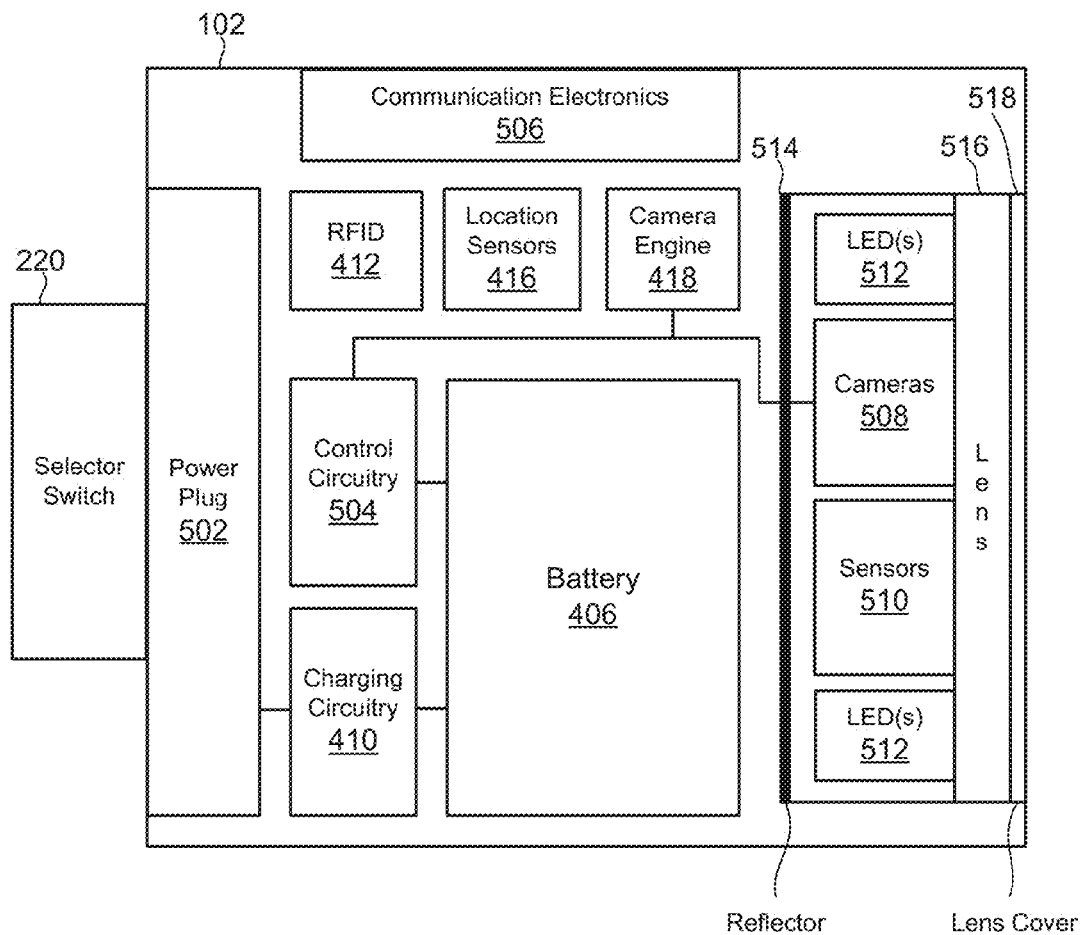

FIG. 5 illustrates various components of an embodiment relay module 102 in which the cameras, sensors, and illuminations sources are housed together. In example illustrated in FIG. 5, the relay module 102 includes a selector switch 220, a battery 406, charging circuitry 410, a radio-frequency identification (RFID) module 412, location sensors 416, a camera engine 418, a power plug 502, control circuitry 504, communications electronics 506, cameras 508, sensors 510, LEDs 512, a reflector 514, a lens 516, and a lens cover 518.

The cameras 508, sensors 510, and LEDs 512 may be housed together and mounted on the reflector 512. The lens cover 518 may be arranged so as to help seal the relay module 102 and/or protect the electronics. In an embodiment, reflector 512 may be arranged so as to reduce or minimize the amount of power required for LED's 512 to provide sufficient lumens for vision capability. In an embodiment, reflector 512 may be arranged so as to reduce the current draw of the relay module 102, and thus reduce the power consumption, battery weight, and/or physical dimensions of the relay module 102.

The cameras 508 may include video cameras and still image cameras. The cameras 508 and LED's 512 may be arranged to capture both visible and near infrared portions of the electromagnetic spectrum present around the relay module 102.

In various embodiments, the LED's 512 may be controlled by a processor of the relay module 102 and/or a remote device. In embodiment, the LED's 512 may be configured to have a pulsed-duty cycle, which may reduce the amount of current draw and extend the battery life of the relay module 102. In an embodiment, the pulsed-duty cycle of the LED's 512 may be variable. In an embodiment, pulsed-duty cycle of the LED's 512 may be varied by a processor of the relay module 102 and/or a remote device and/or based on the intensity of illumination required for a particular use, application, location, position, or environment.

Figure 6:
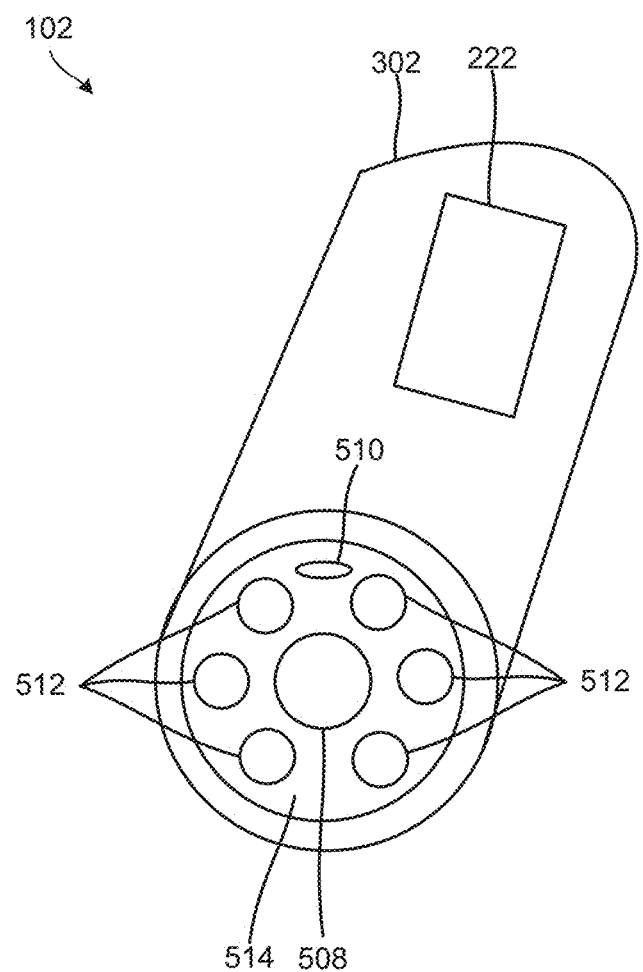
FIGS. 6-8 are front, side, and rear view illustrations of embodiment explosion-proof relay modules.

FIG. 6 is an illustration of front and side portions of an embodiment relay module 102. In example illustrated in FIG. 6, the relay module 102 includes a video camera 508, a sensor 510, and LEDs 512 mounted on a reflector 512, all of which are encapsulated in a sealed case or housing 302. A fastener 222 attached to the housing 302 may be used to fasten the relay module 102 onto a helmet or other equipment.

The video camera 508 may be positioned in the center of the front of the relay module 102. A plurality of LEDs 512 may be arranged around the video camera 508. The LEDs 512 may generate electromagnetic radiation in the visible and/or near infrared spectrum arranged. The sealed case/housing 302 may be a cylindrical or rectangular in shape or a combination of cylindrical and rectangular to facilitate the inclusion of all the electronics to meet the required form factor for a low profile explosion proof video and communications relay module 102.

While FIG. 6 illustrates one example configuration, it should be understood that the arrangement the LEDs 512, camera 508 and/or sensor 510 illustrated in FIG. 6 is exemplary and not intended to limit the invention to specific arrangement or configuration.

Figure 7:
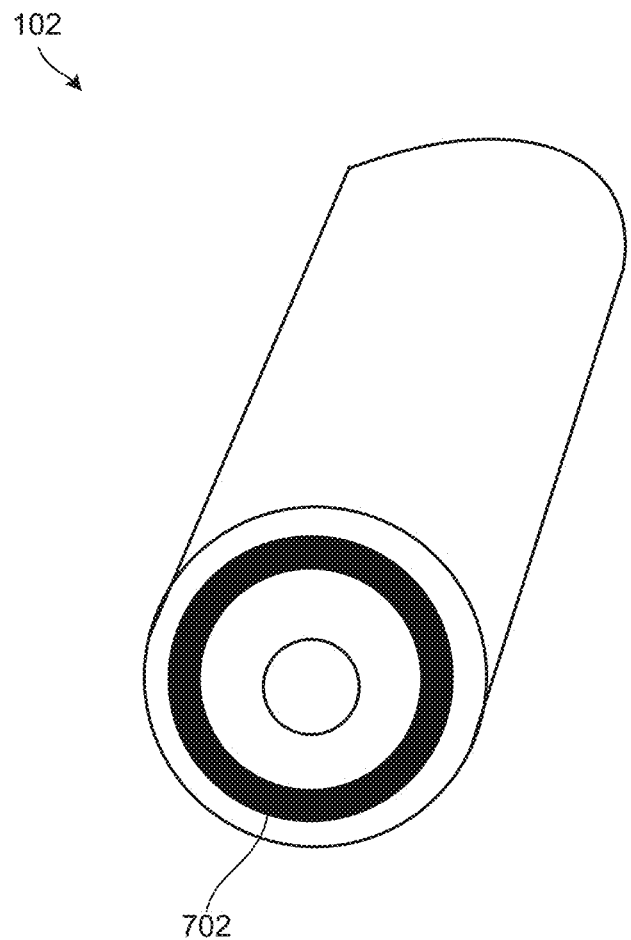

FIG. 7 is an illustration of rear and side portions of an embodiment relay module 102. In example illustrated in FIG. 7, the relay module 102 includes a battery charging adaptor 702, which may be circular in design and/or designed to a charging base.

Figure 8:
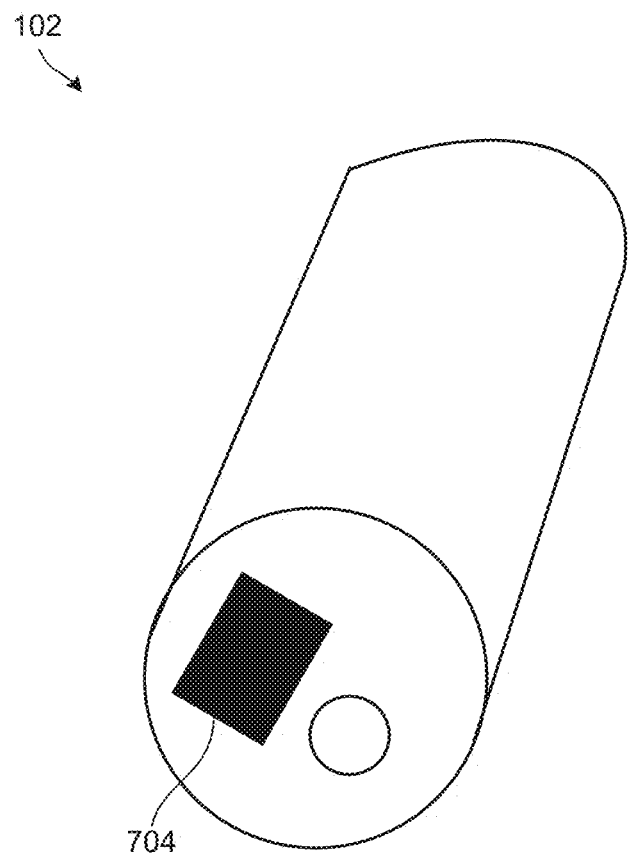

FIG. 8 is another illustration of rear and side portions of an embodiment relay module 102 in which a charging receptacle 704 the battery charging adaptor 702 is rectangular or square, which may facilitate a better mechanical fit and structural integrity for the relay module 102.

Figure 9:
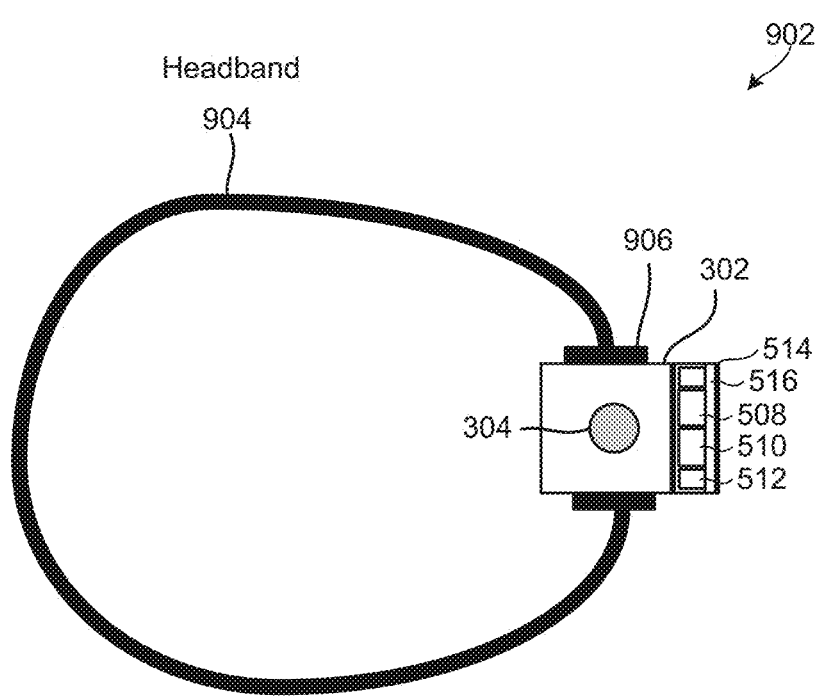
FIG. 9 is an illustration of another embodiment explosion-proof relay module suitable for use by personnel that may or may not be required to enter an explosive environment.

FIG. 9 illustrates components that may be included in another embodiment explosion proof video and communications relay module 902 suitable for use by personnel working in conjunction with others who are in an explosive environment and may or may not be required to enter the explosive environment. The relay module 902 may be mounted to a user's head or helmet, or may be positioned on a stationary platform for continuous remote monitoring.

The relay module 902 may include communications circuitry for sending and receiving voice, data, video, and other similar information, an illumination source (e.g., light emitting diodes, etc.), a selector switch 304, cameras 508, a lens 516, a lens cover 518, LEDs 512, sensors 510, a sealed case or housing 302, and any or all the other components that may be included in the relay module 102 discussed above.

As discussed above, all of the electronics, wires, contacts, and metal elements of the relay module 902 may be included in the sealed case/housing 302, which may formed from non-conductive materials, such as plastics, rubbers, thermoplastics (e.g., poly-methyl-methacrylate or Plexiglas), etc. The sealed case/housing 302 may be formed to include a hermetic and/or airtight seal that isolates the electronics, wires, contacts, and metal elements of the relay module 902 from the exterior atmosphere.

The relay module 902 may include a strap 904 for fastening the device to the user's head or helmet. The strap 904 may be formed from an elastic material or any other material suitable for fastening the device to the user's head or helmet. The strap 904 may include an adjustment 906 means or mechanism for securing the relay module 902 user's head or helmet.

The selector switch 304 may be a push button or rotary or any type of selector which can turn on the unit and provide the functionality needed for someone wearing gloves. The selector switch 304 may be mounted on the top, front, or the side of the relay module 902.

In the example illustrated in FIG. 9, the housing 302 for explosion proof video and communications relay module 902 is depicted as being rectangular. In an embodiment, the case/housing 302 may be cylindrical or a combination of cylindrical and rectangular to facilitate the inclusion of all the electronics to meet the required form factor for a low profile relay module 902.

Figure 10:
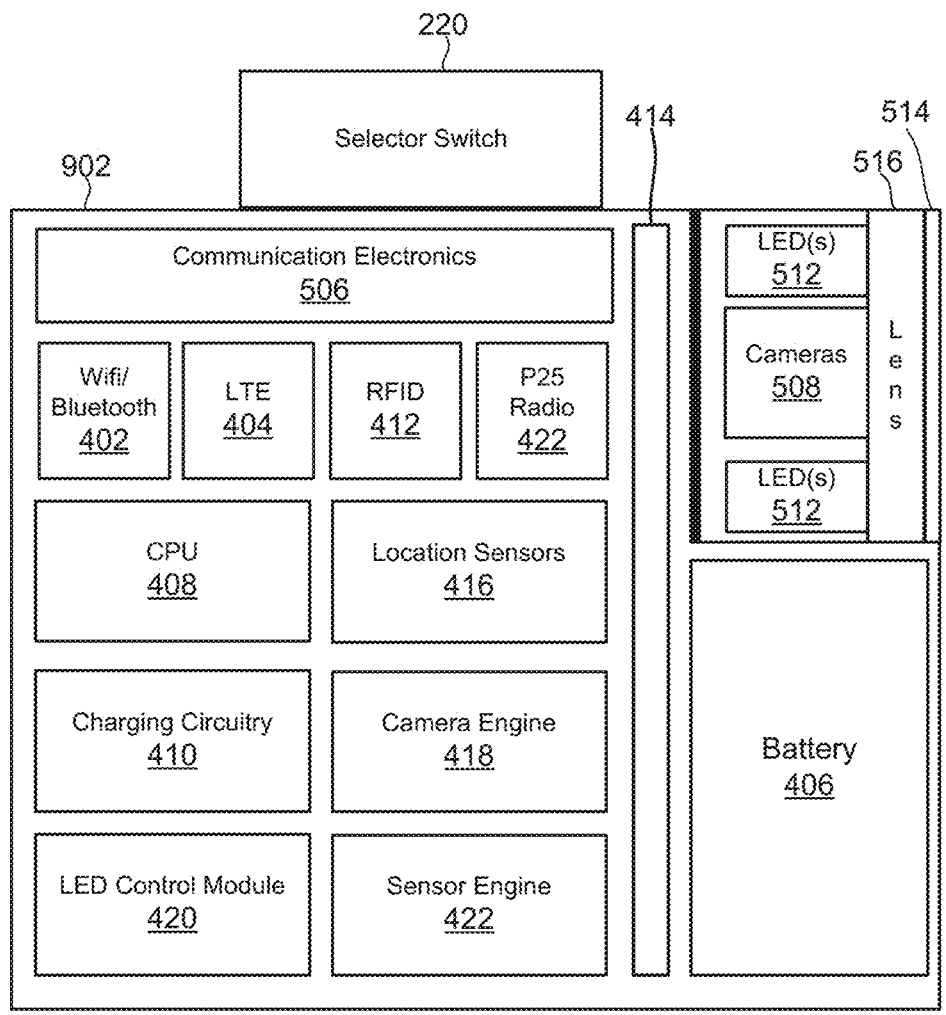
FIG. 10 is component block diagrams illustrating various additional logical and functional components that may be included in an embodiment explosion-proof relay module.

FIG. 10 illustrates various logical and functional components that may be included in an embodiment relay module 902. The relay module 902 may include a selector switch 220, a battery 406, Bluetooth/WiFi radios 402, an LTE module 404, a processor or central processing unit (CPU) 408, charging circuitry 410, a radio-frequency identification (RFID) module 412, antennas 414 for sending and receiving electromagnetic radiation, location sensors 416, a camera engine 418, an LED control module 420, a sensor engine 422, a P25 radio 422, and other well known components (e.g., accelerometer, etc.) commonly included in modern electronic devices (e.g., smartphones, mobile gaming consoles, etc.). The relay module 902 may also include a communications electronics 506, cameras 508, LEDs 512, a reflector 514, a lens 516, a lens cover 518, and any or all the other components that may be included in the relay module 102 discussed above.

Figure 11:
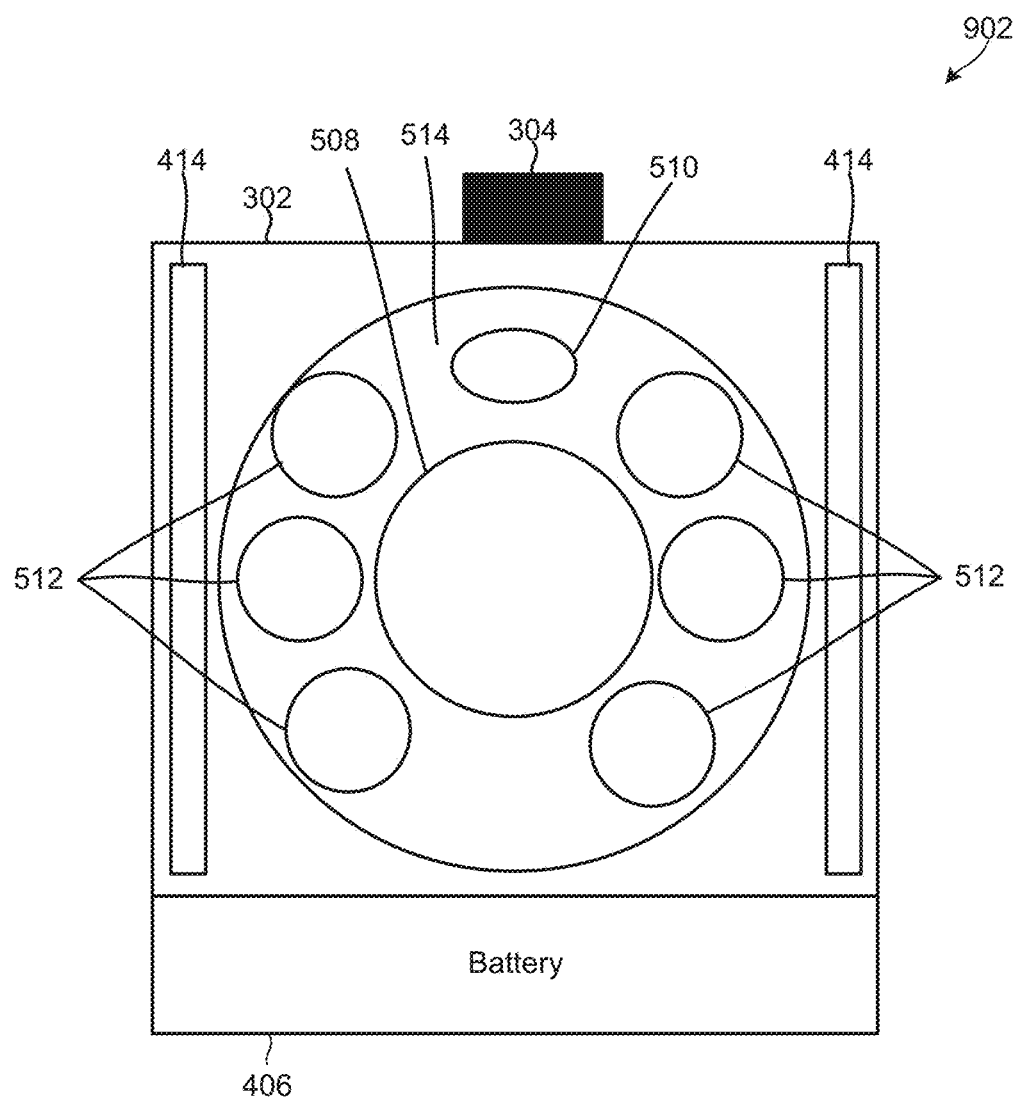
FIGS. 11-13 are front and rear view illustrations of another embodiment explosion-proof relay module.

FIG. 11 is an illustration of a front portion of an embodiment relay module 902. In example illustrated in FIG. 11, the relay module 102 includes a selector switch 304, a battery 406, antennas 414, a video camera 508, a sensor 510, LEDs 512, and a reflector 514, all of which may be encapsulated in a sealed case or housing 302.

Figure 12:
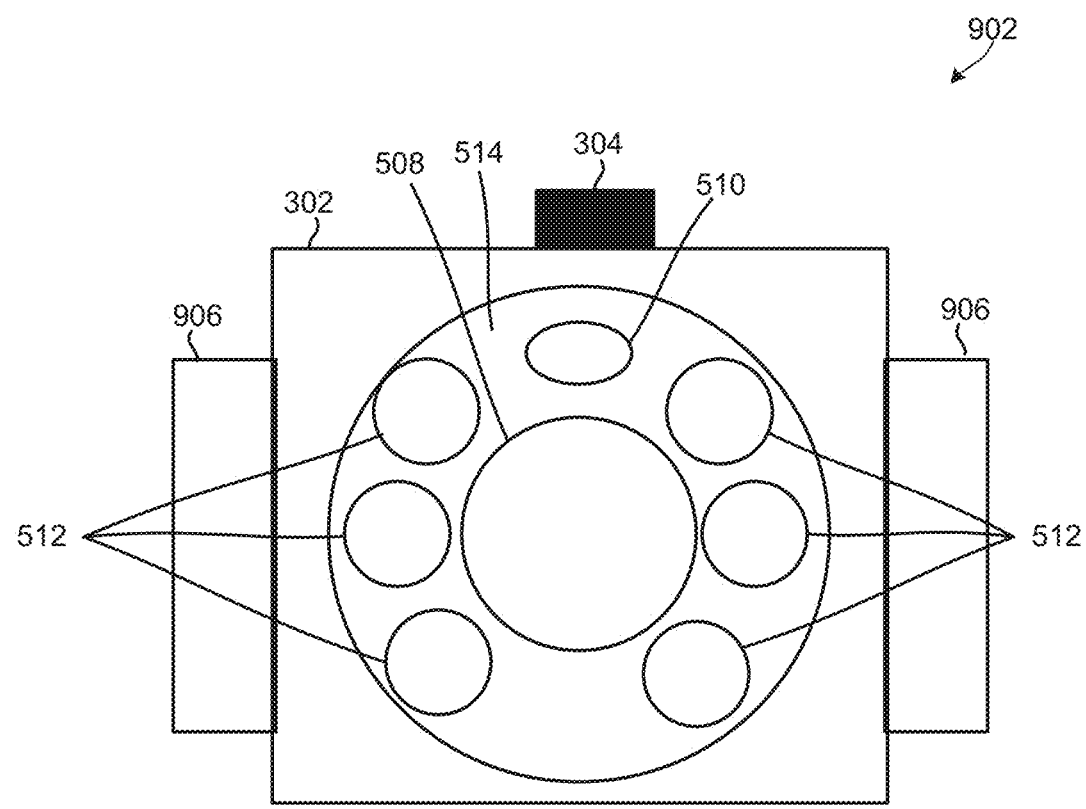

FIG. 12 illustrates that an adjustment 906 mechanism may be attached to each side of the housing 302 and operable to secure the relay module 902 user's head or helmet.

Figure 13:
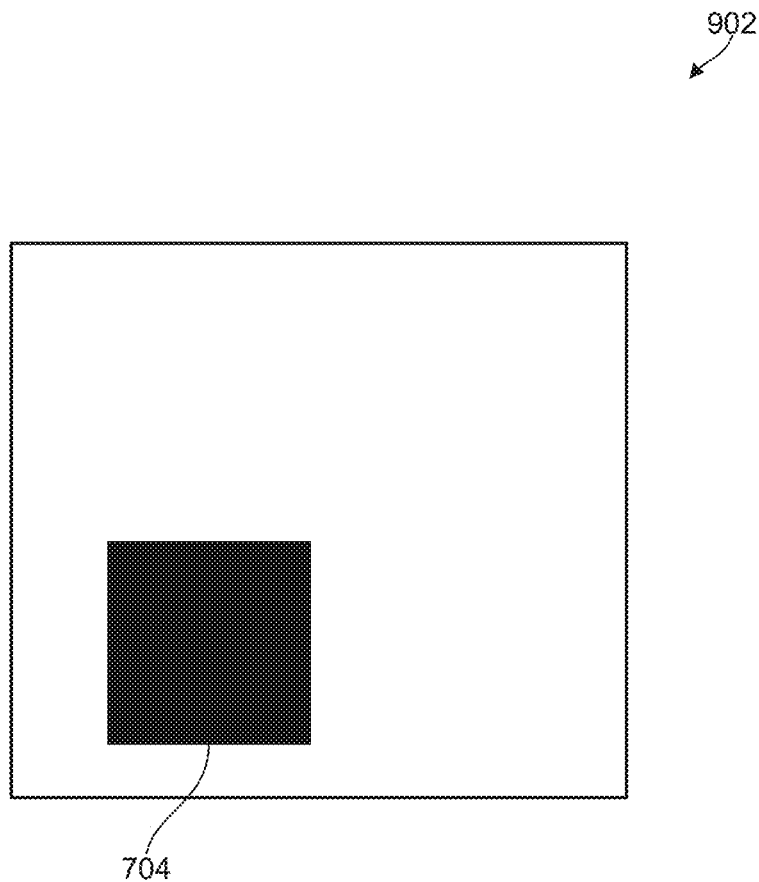

FIG. 13 is an illustration of a bottom portion of the relay module 902 illustrating the location of the charging adaptor 704 in accordance with an embodiment. The charging adaptor 704 may be configured to interface with a charging base to charge the battery 406, which may be achieved via induction. The charging adaptor 704 may be also be configured to fit into a charging receptacle in the charging base, as described in more detail further below.

The relay modules 102 may be configured to operate as a standalone devices. The relay modules 102 may also be grouped with other devices for collaborative communication in which one or more of the relay modules may operate as an access point for other relay modules or other wireless devices.

Figure 14:
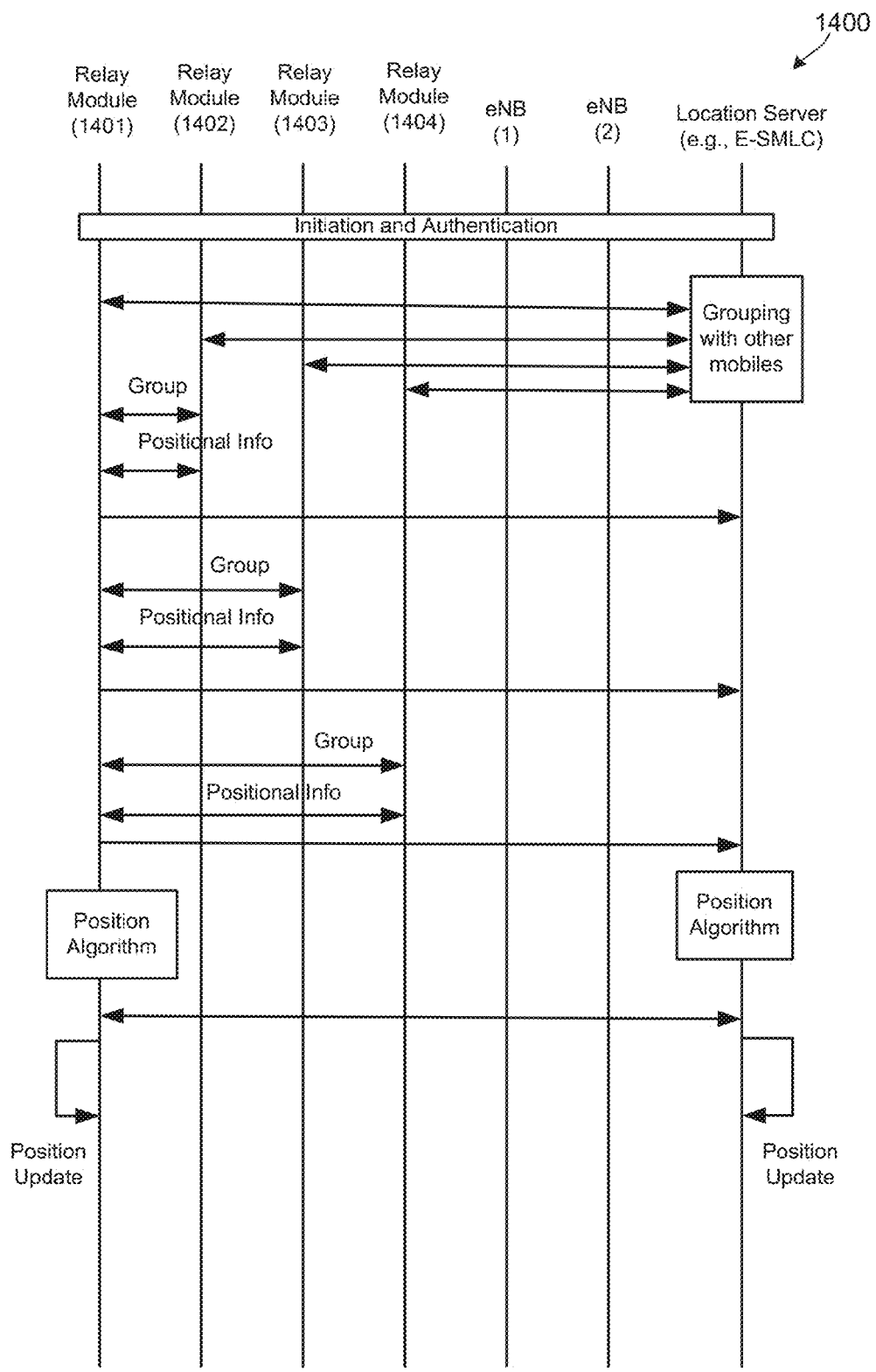
FIG. 14 is a process flow diagram illustrating an embodiment method of grouping multiple explosion-proof relay modules to perform group relay operations.

FIG. 14 illustrates an embodiment method 1400 for the initializing and authenticating a plurality of relay modules, grouping the relay modules with other explosion relay modules, and confirming the groupings. When energized, each of relay modules 1401, 1402, 1403 and 1404 may immediately scan the airwaves for defined and preferred radio frequency (RF) carriers and systems. For example, after relay module 1401 is powered on, it may scan the airwaves for predefined and/or preferred radio frequency carriers and/or systems with which the relay module 1401 may connect to the network. If the relay module 1401 does not find an appropriate network with which it may connect (or loses its connection) the relay module 1401 may scan the airwaves for other radio access systems (e.g., mobile network, radio access point associated with a mobile device, etc.) to acquire (i.e., connect to) until a connection to a network/Internet is established. These operations may also be performed in the event of a dropped call or power interruption.

The relay module 1401 may also begin acquiring GPS signals while scanning the airwaves for radio frequency carriers and/or systems. If the relay module 1401 cannot acquire GPS signals, a network component (not illustrated) may help determine the relative position of the relay module 1401 based on one or more of the location determination solutions discussed herein (e.g., based on the antenna used for the radio access point, the time delay, angle of arrival, etc.).

The relay module 1401 may acquire (i.e., connect to) an appropriate radio access system, radio frequency carrier and/or system via the mobile device's system acquisition system and establish a connection to a network via an eNodeB (eNB1 or eNB2) or any other communication technologies discussed above.

After the relay module 1401 acquires the radio access system, the network (i.e., a component in the network such as a server) will know the approximate location of the relay module 1401 (e.g., via one or more of the location determination solutions discussed above, such as proximity to base towers). In addition, the relay module 1401 may compute its current location (e.g., via GPS and/or the location determination solutions discussed above), store the computations in a memory of the mobile device, and report its current location to the network.

In addition to knowing the approximate location of the relay module 1401, the network may also be informed of the locations of other relay modules 1402, 1403, 1404 and the proximity of the other relay modules 1402, 1403, 1404 to the recently acquired relay module 1401.

After initialization and authentication, the relay modules may be instructed to be grouped by the network. Relay modules 1401 and 1402 may initiate sharing of information for position location, either due to the network driven grouping request or when the relay module has lost contact with the network and attempts to find a suitable relay module to help in its position location and possible connection to the network via a relay or to another network.

Relay module 1401 may send a request for position information to relay module 1402. The information may be sent after the authentication process between relay modules, and may include a time stamp. The time stamp may be sub seconds in size (e.g., milliseconds). The relay module 1402 may respond with a message that also has a time stamp, and timing information pertaining to when the relay module 1402 received the time stamp from relay module 1401. Three messages may be transferred quickly to establish time synchronization. The time differences may then be compared, along with possible pulses or pings, to establish an estimated distance vector between the relay modules. Knowing the distance vector and the x, y, and z coordinates of both 1401 and 1402, a point-to-point fix may be established.

The relay module 1401 may then initiate communication with relay modules 1403, 1404 and repeat the operations discussed above with respect to relay module 1402 for each of relay module 1403, 1404. After obtaining two or more distance vectors along with positional information, the relay module 1401 may compare the new coordinates to its previously computed current location, and adjust the location computations accordingly.

The positional information distance vectors may be sent to the network for positional processing with other network positional information. Based on the position calculated for the relay module, the network (i.e., a component in the network, such as a network server or E-SMLC) may instruct the relay module to adjust its positional information.

Additionally the relay module 1401 may also make a positional correction if the network either does not respond in time, which may result in a message update time out. Alternatively, when the network cannot make the necessary correction, and the positional information may used by another component and/or other relay modules to perform the necessary corrections.

If the error is greater than x % for a lower positional confidence level then no update is required. As the mobile receives other sensor data and more than a pre-described distance in any direction or a combined distance vector than the positional update process begins again. If the x % of positional confidence level is less than desired, additional positional updates may be made with the grouped relay modules (e.g., iteratively) to improve the confidence level of the positional information. Additionally if the positional information from one of the relay modules that is being attempted to obtain a distance vector appears to be in error, then that relay modules data may be selected to not be used for this iterative step of performing positional updates with other grouped relay modules. However it will continue to be queried as part of the process since its position location could be corrected in one of the steps it is taking to improve its position location as well.

Additionally in the event that one or more relay modules lose communication with the core network it will still be possible to maintain position accuracy through one of the other grouped relay modules. It will also be possible to continue to maintain a communication link by establishing a network relay connection with another of the relay modules in the same group which still has communication with the network itself.

In various embodiments, the relay modules 1401, 1402, 1403 and 1404 may be grouped based on their proximity to each other and/or a grouping plan, which may be stored in the memory of the relay modules, in a network component, or a remote mobile device. In addition, the network may, based on policy and rules pre-established or defined by the incident commander, instruct all the relay modules 1401, 1402, 1403 and 1404 to form a local network. This may be achieved by a network component or a remote mobile device assigning a first relay module 1401 as a master relay module so that the assigned master relay module 1401 operates as a router to manage all communications between the wireless network and the other relay modules 1402, 1403, 1404 in the group.

Figure 15:
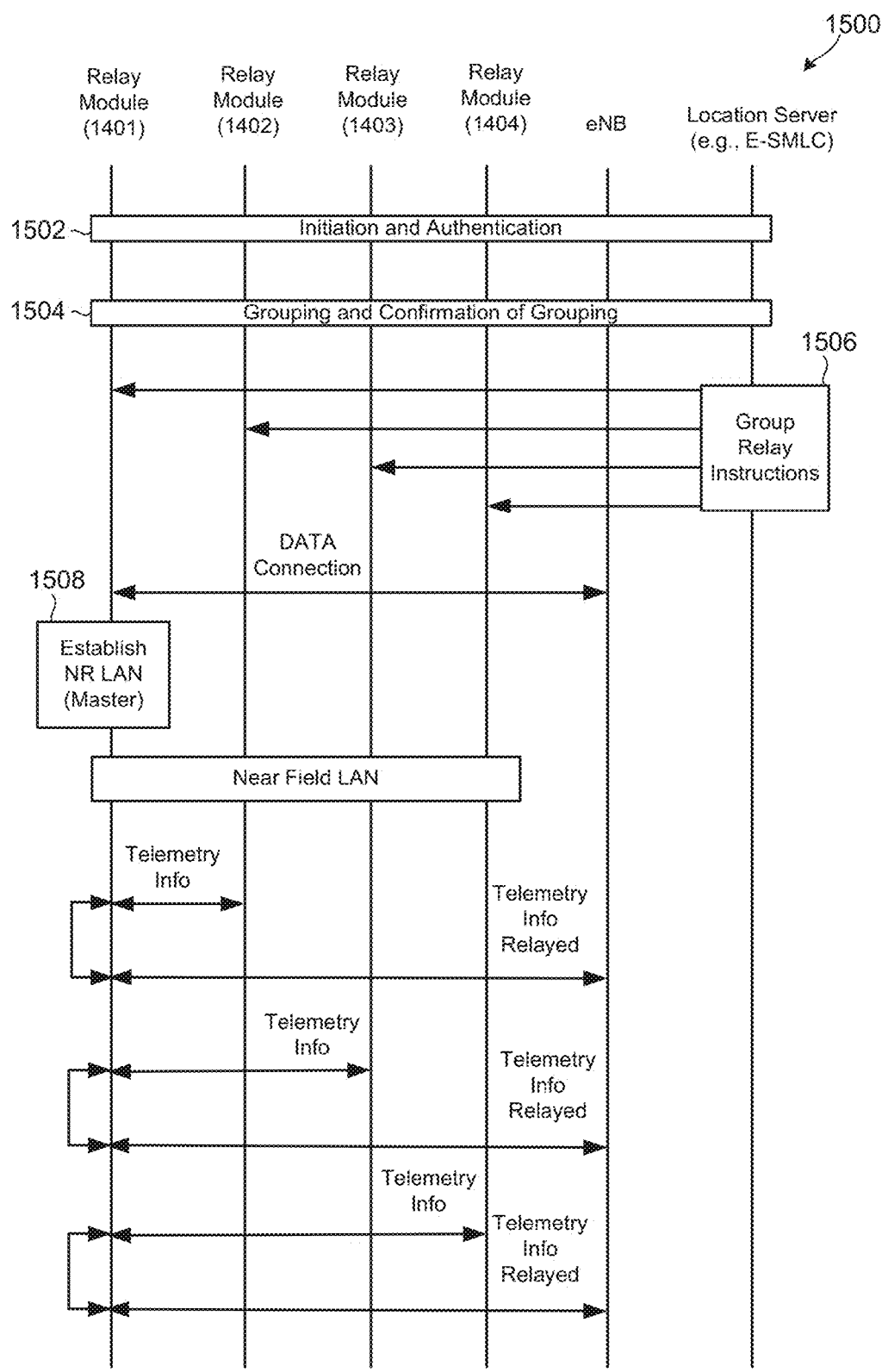
FIG. 15 is a process flow diagram illustrating an embodiment explosion-proof relay module method of communicating telemetry information by performing group relay operations.

FIG. 15 illustrates an embodiment method 1500 for performing group relay operations for relaying telemetry information to a plurality of relay modules. In blocks 1502 and 1504, the relay modules 1401, 1402, 1403, and 1404 may perform initialization, authentication, and grouping operations, as discussed above with reference to FIG. 14. In block 1506, the location server may send group relay instructions to any or all of the relay modules 1401, 1402, 1403, and 1404. In the example illustrated in FIG. 15, the group relay instructions designate the relay module 1401 as the master relay module, which establishes a data connection to the network via an eNodeB (eNB).

In block 1508, relay module 1401 establishes a near field local area network (NR LAN) with the grouped relay modules 1402, 1403, 1402, and takes on a master role in the established NR LAN. Each of the grouped relay modules 1402, 1403, 1402 may send telemetry information (including voice, data and video) to the master relay module 1401, which relays the telemetry information to appropriate component over the network via the eNodeB (eNB).

In an embodiment, the relayed telemetry information may include positional information, bio-sensor information, user bio-information, environmental information, user condition information, and/or any other information that may be available to the relay modules 1401, 1402, 1403, 1404.

Figure 16:
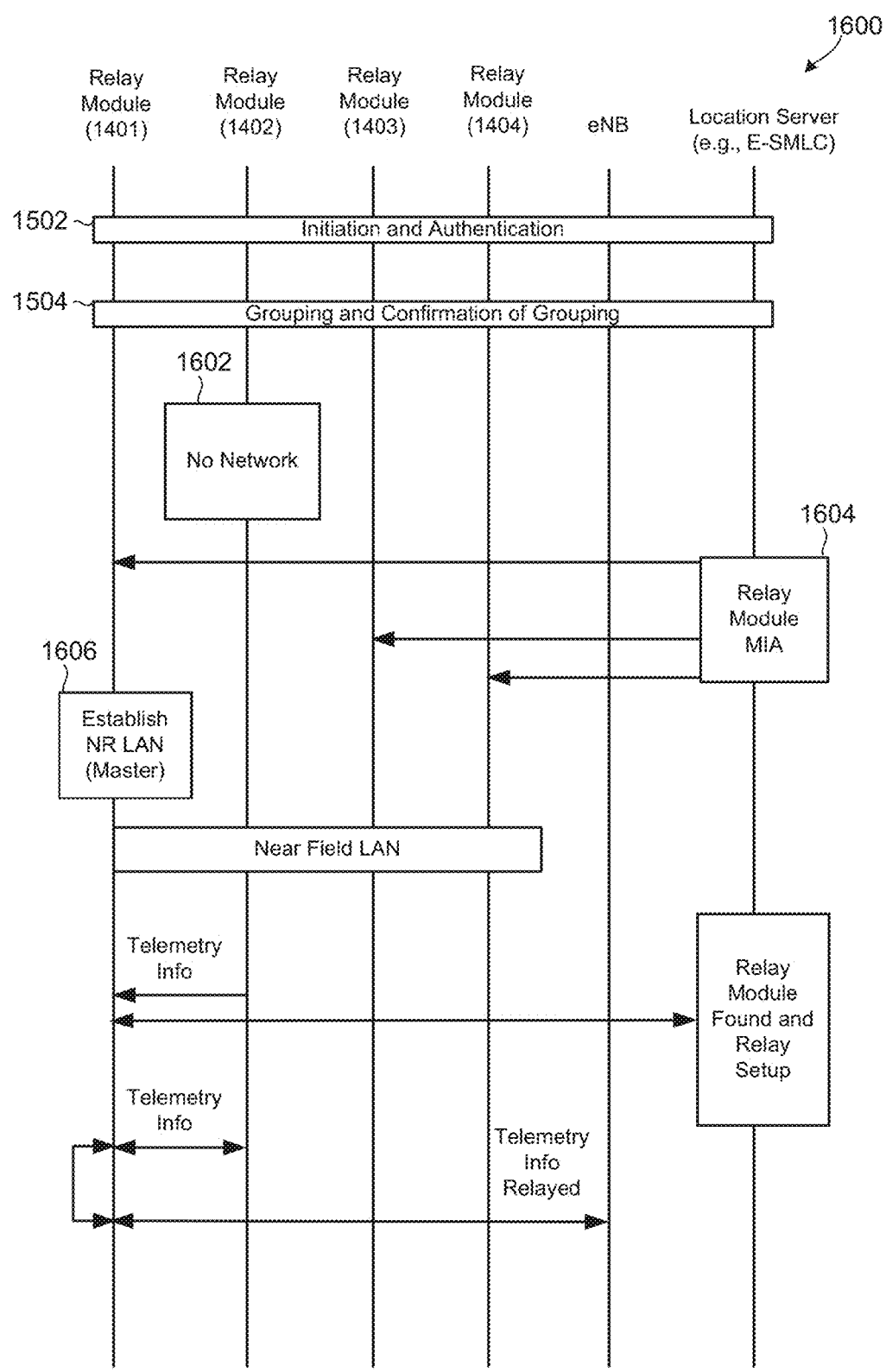
FIG. 16 is a process flow diagram illustrating another embodiment explosion-proof relay module method of communicating telemetry information.

FIG. 16 illustrates an embodiment relay module method 1600 for reestablishing lost communications links and performing group relay operations to relay telemetry information. In blocks 1502 and 1504, the relay modules 1401, 1402, 1403, and 1404 may perform initialization, authentication, and grouping operations, as discussed above with reference to FIGS. 14 and 15. In block 1602, relay module 1402 may determine that it has lost its connection to the eNodeB (eNB) and can no longer can access the communications network. As part of block 1602, the relay module 1402 may begin scanning the airwaves for another radios access system to acquire.

In block 1604, a location server (e.g., E-SMLC) may determine that it can no longer communicate directly with relay module 1402, and send the last known position of the relay module 1402 to the other relay modules 1401, 1403, 1404 along with group relay instructions that designate the relay module 1401 as the master relay module. In block 1606, relay module 1401 establishes a near field local area network (NR LAN) with the grouped relay modules 1402, 1403, 1402, and takes on a master role in the established NR LAN.

The relay module 1402 may send location and telemetry information (including voice, data and video) to the master relay module 1401. The master relay module 1401 may relay the received location and/or telemetry information to the location server (e.g., E-SMLC), which may use the received information to reestablish a communication link with the relay module 1402. The master relay module 1401 may also relay the telemetry information to appropriate component over the network via the eNodeB (eNB) until, for example, the lost communication link is reestablished.

Figure 17:
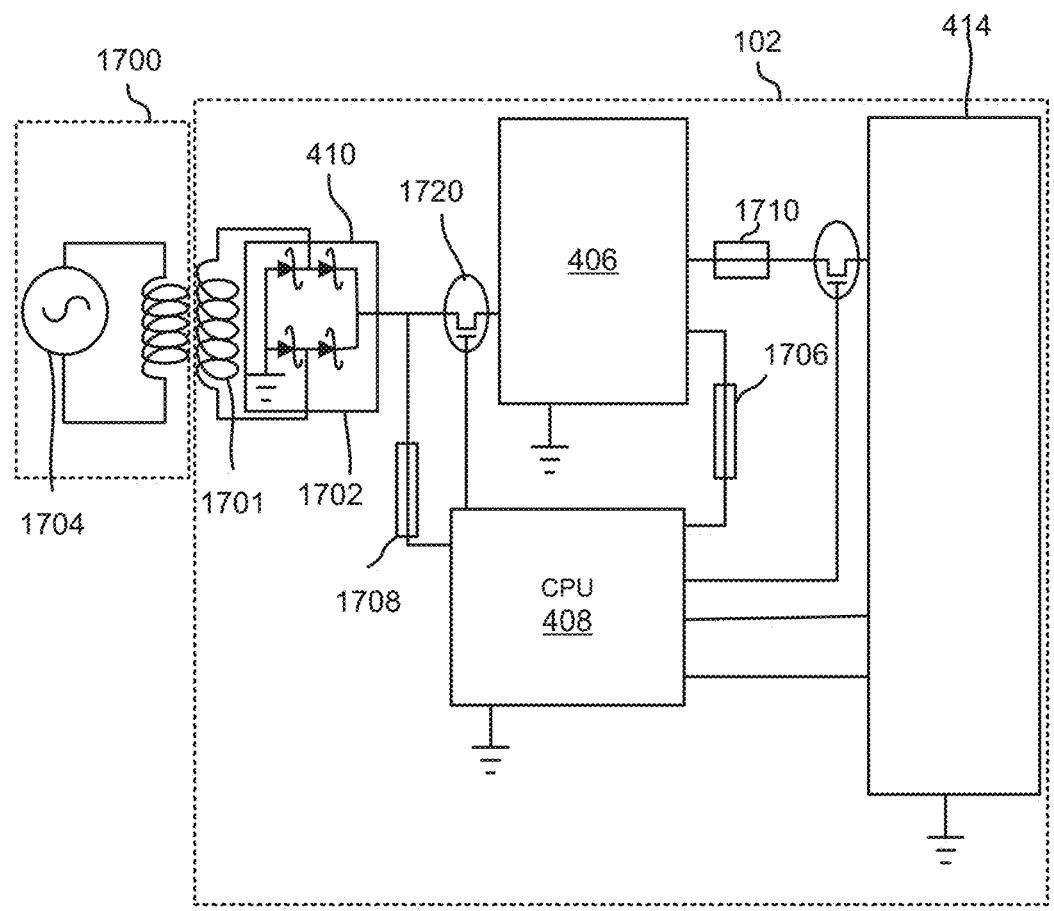
FIG. 17 is a block diagram illustrating an example charging receptacle and various components that may be included an embodiment explosion-proof relay module to support the recharging of a battery of the explosion-proof relay module.

FIG. 17 is an illustration of an example charging receptacle 1700 and charging circuitry 410 the relay module 102 suitable for recharging the battery 406. The recharging power may be provided by an induction coil 1701 positioned within or adjacent to the charging receptacle 1700 and coupled to a rectifier and charge control circuit 1702. Energy may be transferred by induction from induction coil 1701 to charge control circuit 1702, which may ensure that the housing for the explosion-proof video and communication relay module 102 does not expose wires, electronics, or metal contacts to the atmosphere.

The charging receptacle 1700 may be powered by an alternating current (AC) or direct current (DC) source 1704. In an embodiment, the charging receptacle 1700 may be configured to use both AC and DC power as the source 1704. In an embodiment, the charging receptacle 1700 may include a DC to AC switching rectifier configured to convert the DC voltage to AC voltage.

In order to ensure the explosion-proof communication relay module 102 is safe to operate in an explosive environment, the internal circuitry may include various safety features which may not be required in other communication devices. These safety features may include fault isolation circuit elements, such as sealed fuses 1706, which may isolate the battery 406 from a fault in the event of a short-circuit or similar fault. The relay module 102 any of a variety of other known fault tolerant circuit elements 1710 in addition to, or instead of, the sealed fuses 1706. The fault tolerant circuit elements 1710 may be configured to ensure that a short circuit cannot generate a temperature high enough to ignite explosive vapors.

In addition to the fault tolerant circuit elements 1710 and self acting isolation circuitry such as fuses 1706, the processor/CPU 408 may be configured with software to monitor voltage and current through a variety of circuit elements 1708 and activate cut off switches or relays that can isolate overheating or faulted circuitry.

The explosion-proof video and communication relay module 102 may also include internal temperature sensors, such as thermistors 1720 configured to monitor the temperature of the battery 406 and other internal electronics. For example, most rechargeable batteries generate heat during the charge or discharge cycle. By using temperature indicating readings received from a thermistor 1720 coupled to the battery 406, the processor 408 may monitor charging and discharging cycles, such as to terminate charging once the battery reaches a fully charged or elevated temperature condition.

Additionally, the processor 408 may monitor battery temperature to assess the condition of the battery to protect against the possibility of overheating or explosion as has been known to occur in some battery types. The processor 408 may be configured with software to present an alarm to users when the battery temperature or performance indicates that the battery 406 poses a threat of overheating or fire. Similarly, the processor 408 may monitor internal temperatures using other thermistors 1720 to determine whether any of the electronics are overheating or if the module itself is in a overheat condition, such as in the presence of external fire. The processor 408 may also be configured to take preventative actions to limit damage to the module in the event of overheating, including generating audible or visual alarms or transmitting signals via one or more of the antennas 414.

Figure 18:
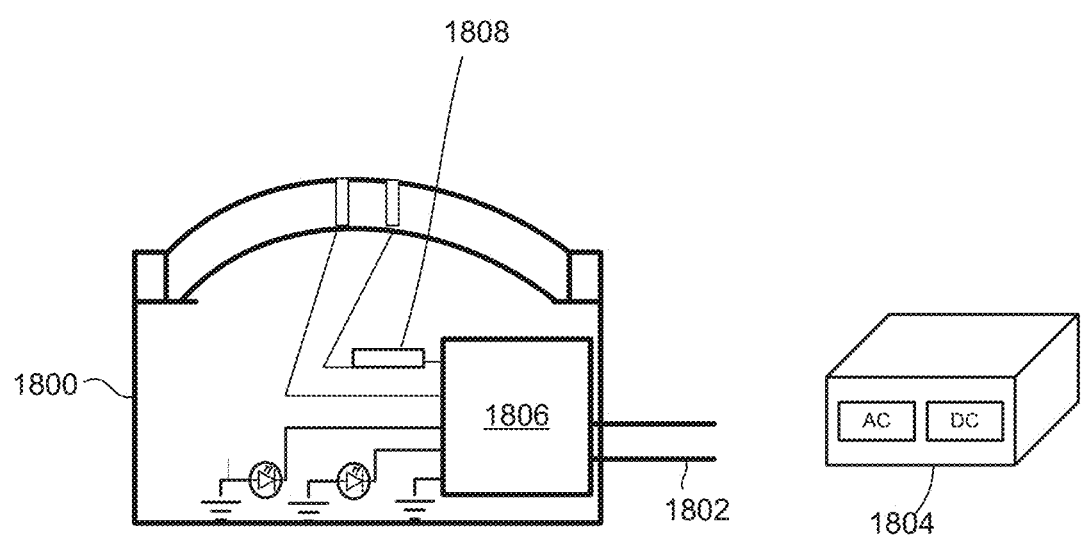
FIG. 18 is an illustration of a charging base suitable for use with the various embodiments.

FIG. 18 is an illustration of a charging base 1800 suitable for use with the various embodiments. The charging base 1800 may include a power input 1802, which may be both an AC and DC power source, depending on an external plug 1804 used to facilitate one or both AC and DC inputs. The charging base 1800 may include power control circuitry 1806 configured to provide the required AC voltage to the inductors for induction power transfer. The charging base 1800 may also include a fusible link 1808 configured for use in over voltage conditions and LED lights to indicate the charging state.

Figure 19:
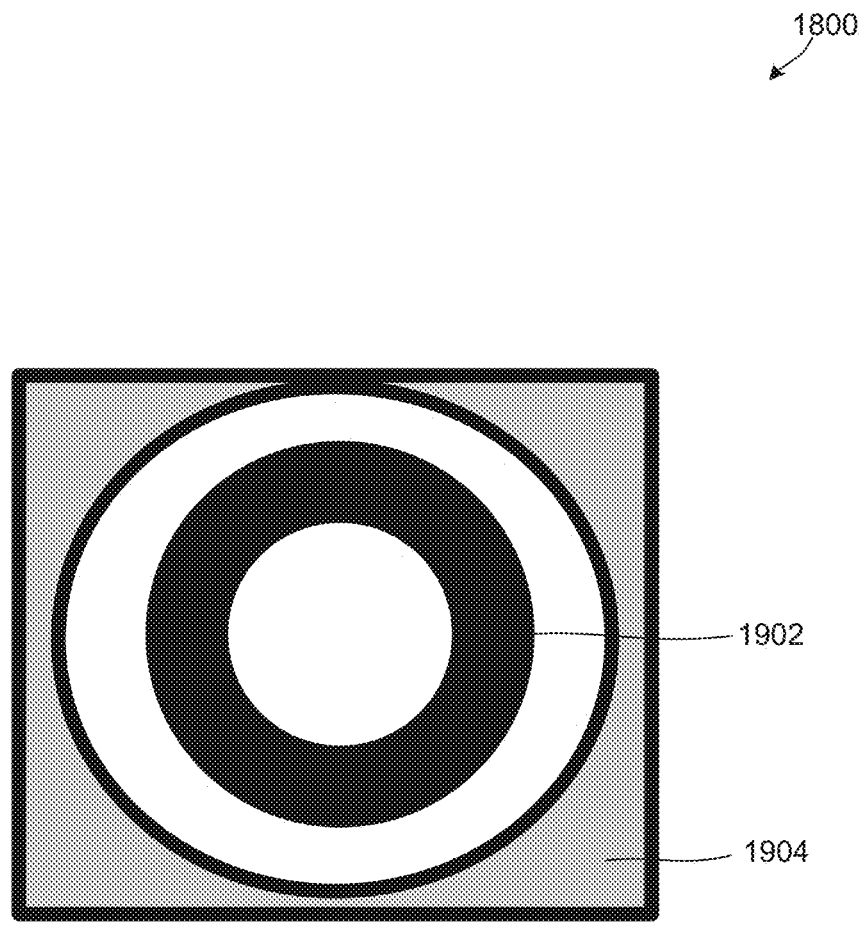
FIG. 19 is an illustration of a top portion of a charging base suitable for use with the various embodiments.

FIG. 19 is an illustration of a top portion of a charging base 1800 suitable for use with the various embodiments. The charging base 1800 may include induction coils 1902 positioned in proximity to a receiving portion 1904 so as to charge the battery 406 of the relay module 102. In an embodiment, the induction coils 1902 may be positioned to facilitate maximum power transfer to the relay module 102.

Figure 20:
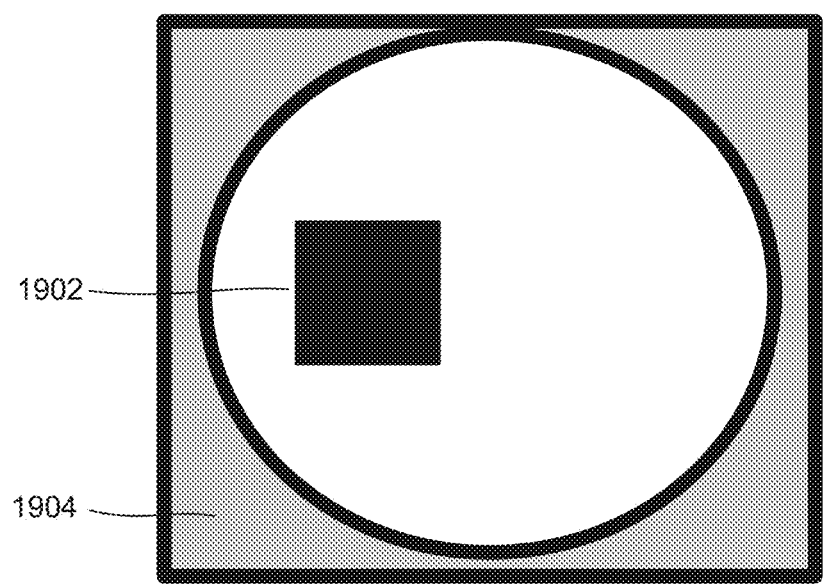
FIG. 20 is an illustration of a top portion of another charging base suitable for use with the various embodiments.

FIG. 20 is an illustration of a top portion of another charging base 1800 suitable for use with the various embodiments. In the example illustrated in FIG. 20, the induction coils 1902 may be shaped and positioned to facilitate maximum power transfer to the relay module 102.

Figure 21:
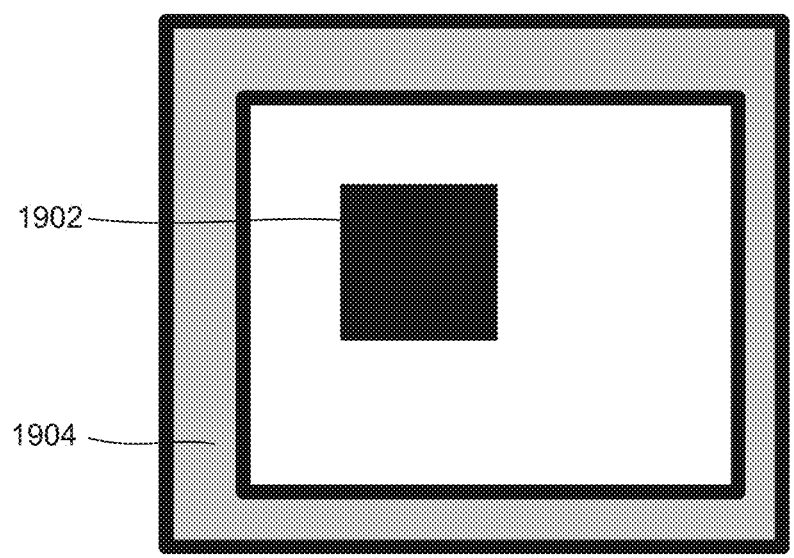
FIG. 21 is an illustration of a top portion of yet another charging base suitable for use with the various embodiments.

FIG. 21 is an illustration of a top portion of yet another charging base 1800 suitable for use with the various embodiments. In the example illustrated in FIG. 21, the induction coils 1902 may be shaped and positioned to facilitate maximum power transfer to the relay module 102.

In an embodiment, the relay modules 102 may be coupled to microphone and/or speaker (e.g., via Bluetooth) to facilitate voice communications with mobile devices, network components and other relay modules 102.

Figure 22:
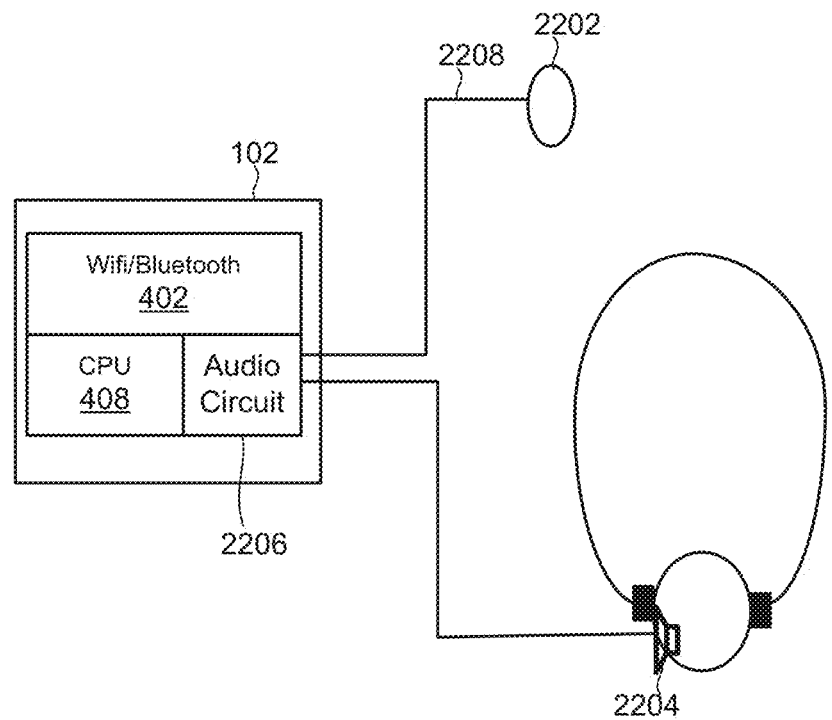
FIG. 22 is a block diagram illustrating communication links and components that may included in an embodiment explosion-proof relay module to support audio communications.

FIG. 22 illustrates that the relay module 102 may include an audio circuit 2206 configured to control a microphone 2202 and speaker 2204 from within the hermetically sealed relay module 102. Input and output to and from the microphone 2202 and speaker 2204 may communicated via a near field communications radio, such as a Bluetooth radio 402. The CPU 402 may control the audio circuit 2206 to control the audio information sent and/or received from the microphone 2202 and speaker 2204.

In the example illustrated in FIG. 22, the microphone 2202 is attached to a strap 2203 that may be worn by personnel entering into an explosive environment. In an embodiment, the strap 2202 may be adjustable. In an embodiment, the microphone 2202 and/or speaker 2204 may include a mounting clip made of non conductive material so that they may be worn by personnel in an explosive environment.

Figure 23:
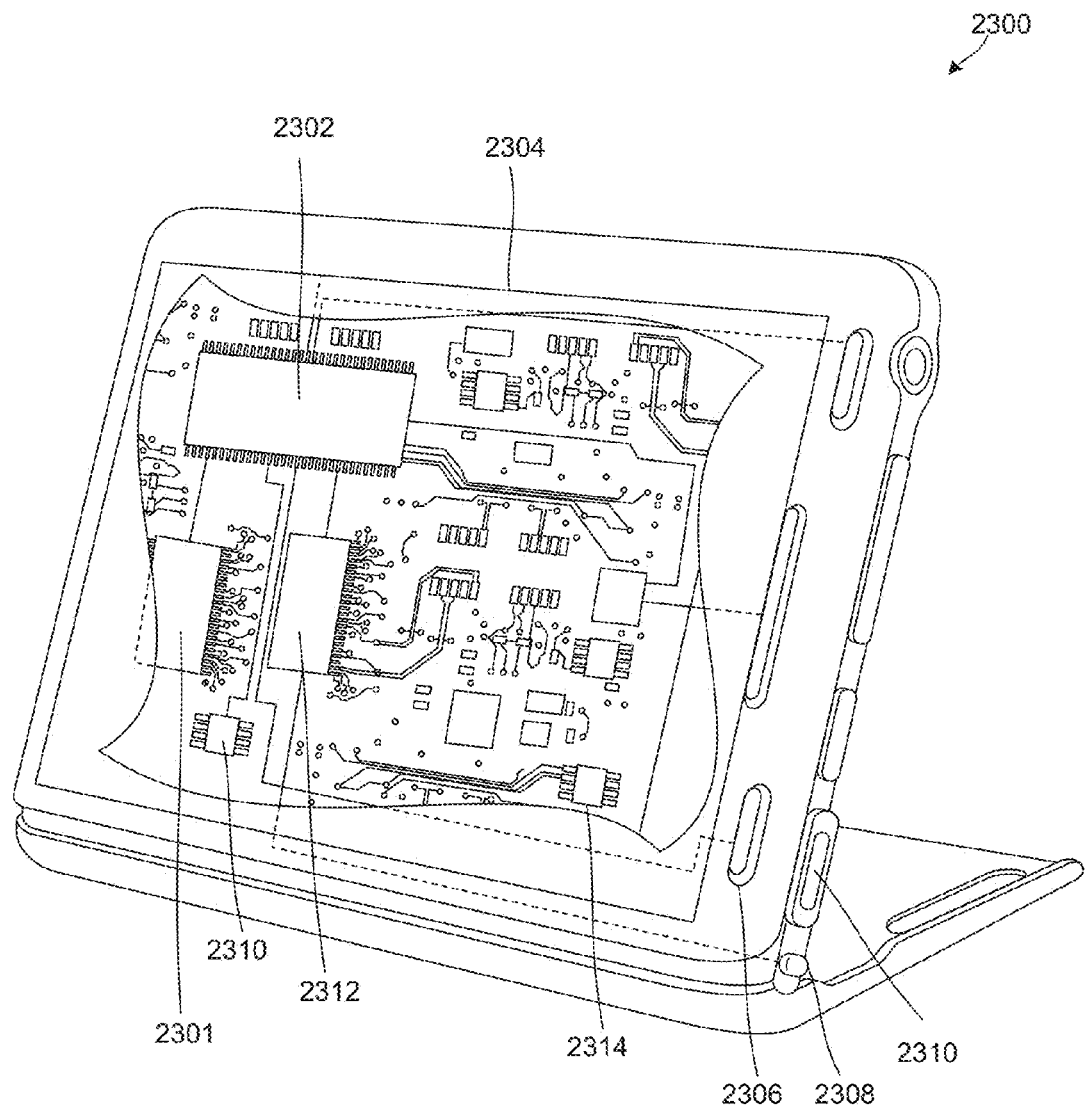
FIG. 23 is a component block diagram illustrating various components commonly included in a mobile transceiver device that are suitable for use in an embodiment explosion-proof relay module.
Figure 24:
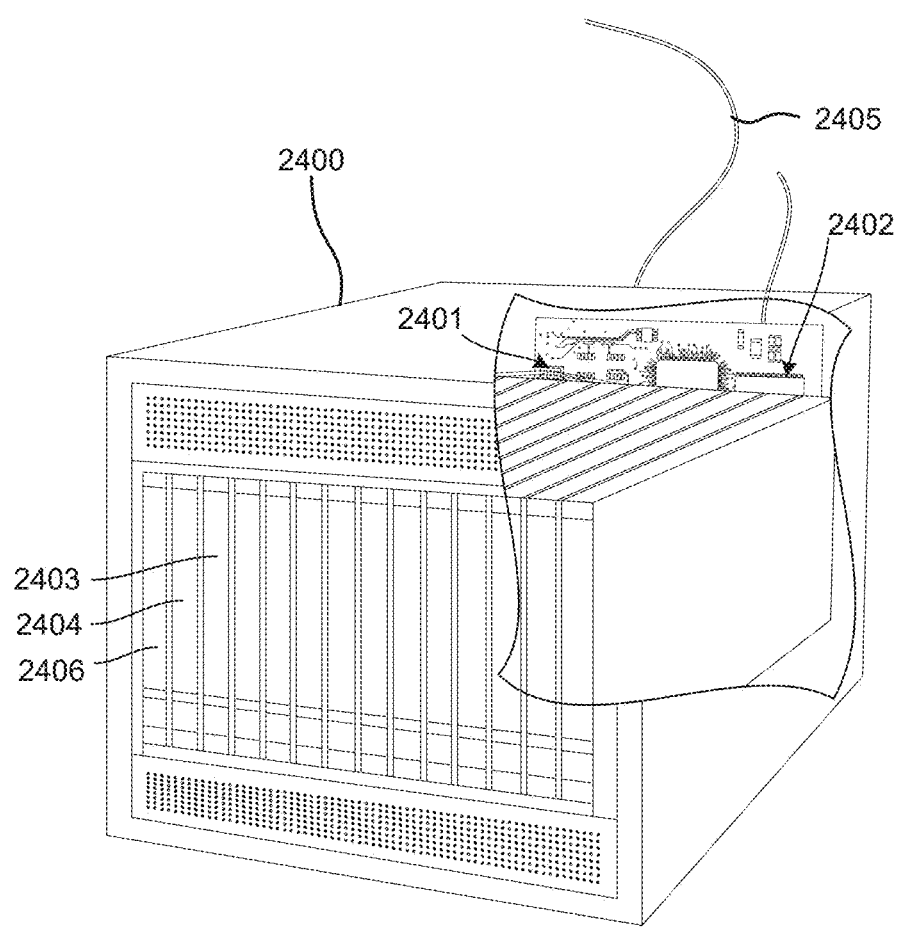
FIG. 24 is a component block diagram of a server suitable for use with an embodiment.

FIG. 23 illustrates various components commonly included in a mobile transceiver device 2300 and suitable for use as a relay module or a mobile device in various embodiments. A typical mobile transceiver device 2300 include a processor 2301 coupled to internal memory 2302, a display 2304, and to a speaker 2306. In addition, the mobile transceiver device 2300 may include an antenna 2308 for sending and receiving electromagnetic radiation that may be connected to a wireless data link and/or cellular telephone transceiver 2310 coupled to the processor 2301. Mobile transceiver devices 2300 also typically include menu selection buttons or rocker switches 2310 for receiving user inputs.

A typical mobile transceiver device 2300 also includes a sound encoding/decoding (CODEC) circuit 2312 which digitizes sound received from a microphone into data packets suitable for wireless transmission and decodes received sound data packets to generate analog signals that are provided to the speaker 2306 to generate sound. Also, one or more of the processor 2301, transceivers 2310, and CODEC 2312 may include a digital signal processor (DSP) circuit (not shown separately). The mobile transceiver device 2300 may further include a peanut or a ZigBee transceiver (i.e., an IEEE 802.15.4 transceiver) 2314 for low-power short-range communications between wireless devices, or other similar communication circuitry (e.g., circuitry implementing the Bluetooth® or WiFi protocols, etc.).

Various embodiments may be implemented on any of a variety of commercially available server devices, such as the server 2400 illustrated in FIG. 15. Such a server 2400 typically includes one or more processors 2401, 2402 coupled to volatile memory 2403 and a large capacity nonvolatile memory, such as a disk drive 2404. The server 2400 may also include a floppy disc drive, compact disc (CD) or DVD disc drive 2406 coupled to the processor 2401. The server 2400 may also include network access ports coupled to the processor 2401 for establishing data connections with a network 2405, such as a local area network coupled to other communication system computers and servers.

The processors 2301, 2401 and 2402 may be any programmable microprocessor, microcomputer or multiple processor chip or chips that can be configured by software instructions (applications) to perform a variety of functions, including the functions of the various embodiments described below. In some mobile devices, multi-core processors 2402 may be provided, such as one processor core dedicated to wireless communication functions and one processor core dedicated to running other applications. Typically, software applications may be stored in the internal memory before they are accessed and loaded into the processor 2301, 2401 and 2402. The processors 2301, 2401 and 2402 may include internal memory sufficient to store the application software instructions.

The various embodiments may be implemented in, or make use of, a variety of commercial cellular networks, including LTE, CDMA, and/or GSM cellular networks. Various embodiments may make use of different implementations of these basic cellular technologies, including WCMDA, TD-CDMA, and TD-SCDMA. In addition, various embodiments may make use of any of a wide variety of wireless cellular data network protocols (e.g., WiFi, WiMAX, Bluetooth, etc.), near field communication technologies (e.g., peanut, ultrawideband, whitespace communication, etc.), and/or radio communication technologies (e.g., land mobile radio or "LMR" and/or Project 25 or "P25" wireless access technologies).

Mobile devices may be configured to communicate with a radio access node, which may include any or all of wireless base station, radio access point, components for establishing communication links to various networks, including LTE, CDMA2000/EVDO, WCDMA/HSPA, IS-136, GSM, WiMax, WiFi, AMPS, DECT, TD-SCDMA, TD-CDMA, a switch, Land Mobile Radio (LMR) interoperability equipment, a Fixed Service Satellite (FSS) (e.g., for remote interconnection to the Internet and PSTN), and other similar components.

The various embodiments may be described with reference to specific frequencies, including the 700 MHz LTE band, the 450 MHz, 700 MHz, 850 MHz bands, the 1710-1755 MHz and 2110-2155 MHz AWS bands (as well as future AWS bands), and the 1.8-1202 GHz PCS band, etc. In addition, various embodiments may be described with reference to specific LTE frequencies. However, the various embodiments may make use of any or all technologies, frequencies, and mobile cellular bands currently in use or which may be employed in the future. By way of example, various embodiments may be implemented with cellular wireless networks that operate at different frequencies, such as WiFi and WiMAX. Thus, it should be understood that references to particular frequencies or technologies are for illustrative purposes only, and not intended to limit the scope of the invention or the claims to particular frequencies, bands or cellular communication protocols unless specifically recited in the claims.

References to cellular telephones in the descriptions of the various embodiments are not intended to exclude other communication devices and two-way radios.

Flashlights are prevalent devices and are used extensively to aid in situation awareness.

Mobile devices may include a subscriber identification module (SIM) hardware, memory, or card that stores one or more encoded values that identify the mobile device's home network. In various embodiments, the mobile device SIM may be a virtual SIM, a removable user identity module (R-UIM), a Mini SIM, a MicroSIM, a universal subscriber identity module (USIM) or any other similar identity module.

Generally, when a mobile device's home network is not available, the mobile device may traverse a preferred roaming list (PRL) to identify a visitor network through which the mobile device may connect to the global telecommunication network. In the various embodiments, a mobile device may include a system acquisition function configured to use information contained in the SIM or PRL to determine the order in which listed frequencies or channels will be tried when the mobile device is to acquire (i.e., connect to) a wireless network system (also referred to as a network or communication network). A mobile device may attempt to acquire network access (i.e., locate a channel or frequency with which it can access a wireless network) at initial power-on or when a current channel or frequency is lost for a variety of possible reasons.

The widespread use of cellular telephone communications makes such mobile devices ideal for many ad hoc communication situations. Cellular telephones, flashlights and video cameras are not designed, however, to operate in explosive environments, so lack fault tolerance circuitry, and have exposed metal contacts which could serve as spark initiators. Therefore, anyone entering potentially explosive environments must forgo his or her conventional cellular telephones and flashlights and other electronics like video capture and relay devices.

The various embodiments overcome the limitations of personal lighting, real time video transfer, and cellular telephone and other mobile wireless communication systems to enable their use in explosive environments, including the ability to relay cellular communications deep into building and underground facilities where cellular signals cannot normally reach. A portable explosion-proof video and communication system is provided and features a hermetically-sealed casing that encompasses all circuit and metal contacts, fault-tolerant electrical circuitry, an induction charging module for recharging internal batteries without the need for any exposed metal contacts, and a power management algorithm that maintains output power at the lowest level that can provide adequate communications. In order to complete the video and communication system, an explosion-proof video and mobile communication device, such as a cellular telephone, and a personal illumination device is provided, which is hermetically sealed and includes fault-tolerant circuitry and an induction charging module for recharging internal batteries without the need for any exposed metal contacts. As a further embodiment, a nonmetallic sealed container is provided for, encompassing conventional mobile communication devices, such as cellular telephone handsets, real time video relay, and personal illumination device so that they can be taken into an explosive environment.

The various embodiments provide explosion-proof video communication system modules and explosion-proof mobile devices, such as cellular telephones, real time video relay modules, and personal illumination modules that are configured for safe operation in an explosive environment and extend the reach of a communication network, such as a cellular telephone network.

The explosion-proof video and communications relay module 102 may receive information from the sensor module 122 or through the communications network, either from the cloud 130 or from the local computer/server 13. Emergency medical services 132 can also use an explosion-proof communications relay module 11 and see the information from any one of the video and communication relay modules. In addition, the communication device 11 can link with a hospital 129 from the ambulance 126 or from the incident itself.

In order to meet the communication requirements to enhance situation awareness with intrinsic safe equipment it may be necessary to change some of the communication equipment form factor for improved functionality.

A number of hazardous work environments exist where conventional communication systems are either impractical or cost prohibitive or both.

Emergency services personnel using conventional communications equipment face the risk of causing explosions when they must enter collapsed buildings, underground passage ways and subways, or vehicle or aircraft accident scenes where explosive vapors may be generated or accumulate. In such situations emergency services personnel need effective and efficient communication means to coordinate with others, call in medical assistance, or seek advice from commanders and technicians positioned outside the danger area. Conventional communications systems may not be feasible, however, due to their potential to initiate an explosion if used in explosive environments.

The capabilities of cellular communications and in particular smart phones make it possible to extend broadband to the edge of the network both for public and private wireless systems. With Broadband to the end of the network it is now possible to have mission-critical information that can be accessed and displayed through cellular communications technology thereby improving situation awareness and responsiveness.

Additionally it is now possible to have video and other data telemetry information besides voice communications sent to other cellular devices. It is also possible to have the video and other telemetry information sent to the incident command so that one can be aware of what the personnel in the explosive environment are actually seeing.

The explosion-proof video and communication relay module may also be capable of operating as an intrinsically safe flashlight so as to minimize the amount of equipment personnel entering the environment need to have donned.

To minimize the risk of explosion in such dangerous situations, it is critical that all equipment used by workers who must venture into such environments be designed to remove all possible ignition sources. Electrical equipment, even low voltage equipment, is of particular concern due to the possibility of a spark generated by a shorted circuit that may ignite a highly explosive environment. In addition, communication equipment has the potential of inducing voltages in exposed metal components which can also cause a spark under certain circumstances.

Ideally, a communication system for use in explosive environments will be able to provide data and voice communications that are scalable so that the extent and range of communication coverage can grow and shrink as the situation requires. In addition, it is desirable to have video and communication equipment which is mobile so that the equipment can be easily donned during a rescue operation and quickly doffed if needed. It is also desirable to have video and communication equipment used by personnel in explosive environment is durable and cost efficient to operate.

In most situations personnel entering a hazardous area need to don protective equipment in order to enter those environments. Specifically Fire Service, Hazmat and other personnel when donning protective equipment lose some mobility, functionality and visibility for situation awareness due to the protective equipment that is donned.

Preferably, a communication system would provide users with the necessary mobility to move about while providing enhanced situation communication and situation awareness in hazardous environments.

The use of both day and night video cameras and of infrared cameras is becoming more commonplace. Their ability to lend to situation awareness has led to many improvements in their use, especially in security, law enforcement, surveillance and inspections.

The foregoing method descriptions and the process flow diagrams are provided merely as illustrative examples and are not intended to require or imply that the steps of the various embodiments must be performed in the order presented. As one of skill in the art would appreciate, one may perform the steps in the foregoing embodiments in any order.

Those of skill in the art will appreciate that the various illustrative logical blocks, modules, circuits, and algorithm steps described in connection with the embodiments disclosed herein that may be implemented as electronic hardware, computer software, or combinations of both. To illustrate clearly this interchangeability of hardware and software, various illustrative components, blocks, modules, circuits, and steps have been described generally above in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

In the foregoing descriptions of the various embodiments the communication systems are described as including explosion-proof cellular telephones 15 which may be any explosion-proof mobile device. One of skill in the art, however, will appreciate that the explosion-proof communication relay modules 10 may be used with non-explosion-proof mobile devices when not used in an explosive environment. Thus, while the explosion-proof communication relay modules 10 enable safe and effective communications in explosive environments, they will work equally effectively in non-explosive environments with any mobile devices (explosion-proof or not) that operate at compatible communication frequencies.

The foregoing method descriptions and process flow diagrams are provided merely as illustrative examples and are not intended to require or imply that the blocks of the various embodiments must be performed in the order presented. As will be appreciated by one of skill in the art, the order of blocks in the foregoing embodiments may be performed in any order. Words such as "thereafter," "then," "next," and etc. are not intended to limit the order of the blocks; these words are simply used to guide the reader through the description of the methods. Furthermore, any reference to claim elements in the singular, for example, using the articles "a," "an," or "the" should not be construed as limiting the element to the singular form.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. In addition, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An explosion-proof communication device, comprising:
    a non-conductive housing;
    a first antenna;
    a second antenna;
    a radio receiver;
    a radio transmitter;
    a battery coupled to a fault tolerant circuit element; and
    a processor coupled to the first antenna, second antenna, radio receiver, radio transmitter, and battery, wherein the processor is configured with processor executable software instructions to perform operations comprising:
        receiving radio frequency signals from the first antenna via the radio receiver in one modulation format; and
        retransmitting the received frequency signals from the second antenna via the radio transmitter in a second modulation format that is different than the first modulation format, and
    wherein the processor, first antenna, second antenna, radio receiver, radio transmitter, battery, and fault tolerant circuit element are hermetically sealed inside the non-conductive housing.

2. The explosion-proof communication device of claim 1, wherein the radio receiver and radio transmitter comprises a signal generator configured to generate a radio frequency signal having a third frequency.

3. The explosion-proof communication device of claim 2, wherein the processor is configured with processor-executable software instructions to perform operation further comprising adjusting the frequency of the radio frequency signal generated by the signal generator.

4. The explosion-proof communication device of claim 1, wherein the processor is configured with processor-executable software instructions to perform operations further comprising controlling an output power of the radio receiver and radio transmitter to maintain the output power at a minimum level consistent with a minimum quality of the service metric and below a maximum output power level.

5. The explosion-proof communication device of claim 1, wherein the processor is configured with processor-executable software instructions to perform operations further comprising grouping the relay device with a wireless transceiver in proximity to the relay device to form a communication group,
    wherein receiving radio frequency signals from the first antenna at a first frequency comprises receiving radio frequency signals from the wireless transceiver in the communication group.

6. The explosion-proof communication device of claim 1, further comprising a fastener attached to the non-conductive housing and configured to secure the explosion-proof communication relay device to a helmet.

7. The explosion-proof communication device of claim 6, wherein the fastener includes a strap.

8. The explosion-proof communication device of claim 6, wherein the fastener includes a fabric hook-and-loop fastening element.

9. The explosion-proof communication device of claim 1, further comprising a selector switch coupled to the non-conductive housing and arranged so that it may be actuated by a human user wearing gloves to cause the processor to perform one or more operations.

10. The explosion-proof communication device of claim 1, further comprising: a camera coupled to the processor; and
    a lens cover arranged to seal and isolate the camera from an exterior atmosphere.

11. The explosion-proof communication device of claim 10, further comprising an illumination source mounted behind a camera lens of the camera and arranged so that the illumination capability of the illumination source is not impeded.

12. The explosion-proof communication device of claim 10, wherein the processor is configured with processor-executable software instructions to perform operations further comprising:
    receiving instructions from a second explosion-proof communication relay device; and
    adjusting a resolution of video information collected by the camera based on the received instructions.

13. The explosion-proof communication device of claim 1, further comprising a sensor hermetically sealed inside the non-conductive housing and configured to monitor environmental conditions outside the non-conductive housing.

14. The explosion-proof communication device of claim 1, further comprising an audio circuit hermetically sealed inside the non-conductive housing and configured to be coupled to a microphone and a speaker outside of the non-conductive housing from within the hermetically sealed non-conductive housing.

15. A communication system for use in an explosive environment, comprising:
    a first explosion-proof communication relay device and a second explosion-proof communication relay device, wherein each of the first and second explosion-proof communication relay devices comprise:
        a non-conductive housing;
        a first antenna;
        a second antenna;
        a radio receiver;
        a radio transmitter;
        a battery coupled to a fault tolerant circuit element; and a processor coupled to the first antenna, second antenna, radio receiver, radio transmitter, and battery, wherein the processor is configured with processor executable software instructions to perform operations comprising:

receiving radio frequency signals from the first antenna via the radio receiver in one modulation format; and retransmitting the received frequency signals from the second antenna via the radio transmitter in a second modulation format that is different than the first modulation format, and wherein the processor, first antenna, second antenna, radio receiver, radio transmitter, battery, and fault tolerant circuit element are hermetically sealed inside the non-conductive housing, and wherein the processor of the first explosion-proof communication relay device is configured with processor executable software instructions to perform operations further comprising establishing a communication link with the second explosion-proof communication relay device.

16. The communication system of claim 15, wherein the first explosion-proof communication relay device further comprises:

a camera coupled to the processor of the first explosion-proof communication relay device; and a lens cover arranged to seal and isolate the camera from an exterior atmosphere, and wherein the processor of the first explosion-proof communication relay device is configured with processor-executable software instructions to perform operations further comprising:

receiving instructions from the second explosion-proof communication relay device; and adjusting a resolution of video information collected by the camera based on the received instructions.

17. The explosion-proof communication device of claim 1, wherein the first frequency modulation format and second frequency modulation format are different formats, the formats comprising amplitude modulation, frequency modulation, phase modulation, LTE, CDMA2000, EVDO, WCDMA, HSPA, IS-136, GSM, WiMax, WiFi, AMPS, DECT, TD-SCDMA, and TD-CDMA.

* * * * *